United States Patent
Ichinose

(10) Patent No.: US 10,704,302 B2
(45) Date of Patent: Jul. 7, 2020

(54) AUTOMOBILE DOOR LOCKING DEVICE

(71) Applicant: MITSUI KINZOKU ACT CORPORATION, Yokohama-shi, Kanagawa (JP)

(72) Inventor: Mikio Ichinose, Yokohama (JP)

(73) Assignee: MITSUI KINZOKU ACT CORPORATION, Yokohama-Shi, Kanagawa (JP)

( * ) Notice: Subject to any disclaimer, the term of this patent is extended or adjusted under 35 U.S.C. 154(b) by 163 days.

(21) Appl. No.: 16/060,016

(22) PCT Filed: Dec. 7, 2015

(86) PCT No.: PCT/JP2015/084305
§ 371 (c)(1),
(2) Date: Jun. 6, 2018

(87) PCT Pub. No.: WO2017/098563
PCT Pub. Date: Jun. 15, 2017

(65) Prior Publication Data
US 2018/0363338 A1    Dec. 20, 2018

(51) Int. Cl.
*E05B 81/76* (2014.01)
*E05B 81/06* (2014.01)
(Continued)

(52) U.S. Cl.
CPC .............. *E05B 81/76* (2013.01); *B60R 25/24* (2013.01); *E05B 81/06* (2013.01); *E05B 81/16* (2013.01);
(Continued)

(58) Field of Classification Search
CPC ...... G07C 9/00309; G07C 2009/00793; G07C 2209/63; G07C 9/00182; G07C 9/00111;
(Continued)

(56) References Cited

U.S. PATENT DOCUMENTS

| 4,763,121 A | 8/1988 | Tomoda et al. |
| 8,860,550 B2 * | 10/2014 | Nakashima ............. B60R 25/04 340/13.24 |

(Continued)

FOREIGN PATENT DOCUMENTS

| DE | 10334624 A1 | 3/2005 |
| EP | 0 735 219 A2 | 10/1996 |

(Continued)

OTHER PUBLICATIONS

Extended European Search Report in EP Patent Application No. 15910180.7 dated May. 22, 2019 (6 pages).

(Continued)

*Primary Examiner* — Mark S Blouin
(74) *Attorney, Agent, or Firm* — Foley & Lardner LLP

(57) ABSTRACT

A motor vehicle door lock apparatus includes a meshing mechanism to mesh with a striker, a locking and unlocking mechanism switches between an unlocking state where a meshing can be released and a locking state where a meshing cannot be released, a control unit to authenticate a transmitter signal and to enable an outside operation switch when the transmitter is authenticated with the transmitter situated outside a vehicle, and an electric releasing mechanism to release a meshing as a result of the control unit driving the releasing motor to activate a releasing operation based on the outside operation switch when the control unit authenticates the transmitter, and the control unit switches from an authenticating state to a non-authenticating state when the transmitter outside the vehicle leaves an authenticating area and drives a locking and unlocking motor activating a locking operation when the control unit is switched to the non-authenticating state.

13 Claims, 20 Drawing Sheets

(51) Int. Cl.
| | |
|---|---|
| *G07C 9/00* | (2020.01) |
| *E05B 81/78* | (2014.01) |
| *E05B 85/00* | (2014.01) |
| *B60R 25/24* | (2013.01) |
| *E05B 81/16* | (2014.01) |
| *E05B 77/34* | (2014.01) |
| *E05B 77/48* | (2014.01) |
| *E05B 79/08* | (2014.01) |
| *E05B 81/72* | (2014.01) |
| *E05B 77/30* | (2014.01) |
| *E05B 81/82* | (2014.01) |
| *E05B 77/28* | (2014.01) |
| *E05B 77/26* | (2014.01) |
| *E05B 77/10* | (2014.01) |
| *E05B 41/00* | (2006.01) |
| *E05B 81/80* | (2014.01) |

(52) U.S. Cl.
CPC .............. *E05B 81/78* (2013.01); *E05B 85/01* (2013.01); *G07C 9/00309* (2013.01); *E05B 41/00* (2013.01); *E05B 77/10* (2013.01); *E05B 77/26* (2013.01); *E05B 77/28* (2013.01); *E05B 77/30* (2013.01); *E05B 77/34* (2013.01); *E05B 77/48* (2013.01); *E05B 79/08* (2013.01); *E05B 81/72* (2013.01); *E05B 81/80* (2013.01); *E05B 81/82* (2013.01); *G07C 2009/00793* (2013.01)

(58) Field of Classification Search
CPC ............ G07C 9/00944; G07C 2209/64; G07C 2209/65; G07C 9/00126; G07C 2009/00555
USPC ........................................................ 340/5.72
See application file for complete search history.

(56) References Cited

U.S. PATENT DOCUMENTS

| | | | |
|---|---|---|---|
| 9,835,751 B2* | 12/2017 | Tokudome | ......... G07C 9/00944 |
| 10,078,932 B2* | 9/2018 | Lee | .................... G07C 9/00309 |
| 2004/0183654 A1 | 9/2004 | Brillon et al. | |
| 2011/0154740 A1 | 6/2011 | Matsumoto et al. | |
| 2016/0251890 A1* | 9/2016 | Sakai | ...................... E05F 15/77 340/5.72 |

FOREIGN PATENT DOCUMENTS

| | | |
|---|---|---|
| EP | 1 146 186 A2 | 10/2001 |
| FR | 2850699 A1 | 8/2004 |
| JP | H05-003509 B2 | 1/1993 |
| JP | 2002-129794 A | 5/2002 |
| JP | 2006-089948 A | 4/2006 |
| JP | 2011-132771 A | 7/2011 |
| JP | 2015-063876 A | 4/2015 |
| WO | WO-00/37755 A1 | 6/2000 |

OTHER PUBLICATIONS

International Search Report for PCT/JP2015/084305 dated Feb. 23, 2016.

Written Opinion of the International Search Authority for PCT/JP2015/084305 dated Feb. 23, 2016.

* cited by examiner

[FIG. 1]
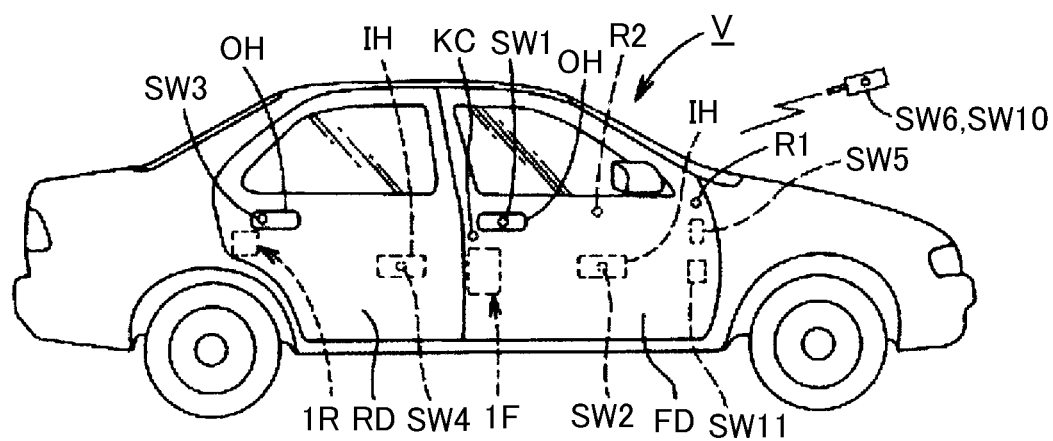
[FIG. 2]
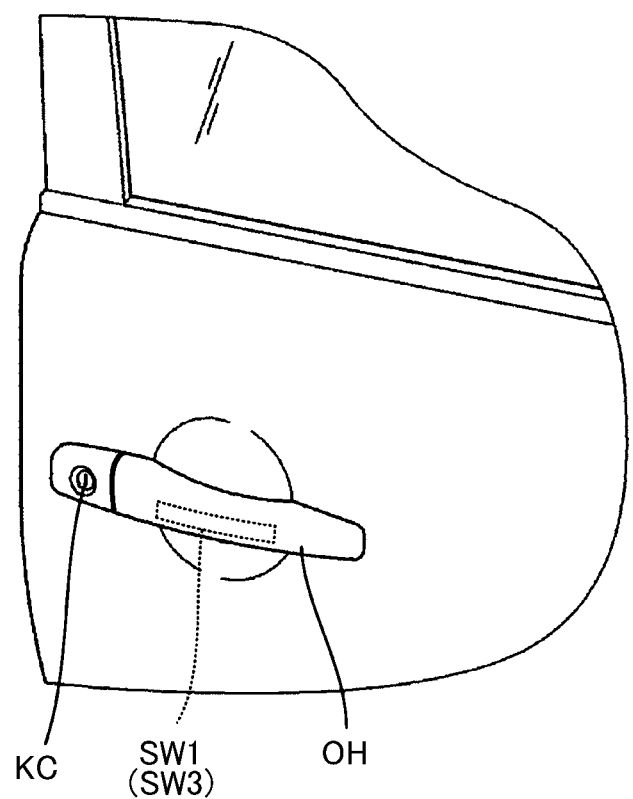

[FIG. 3]
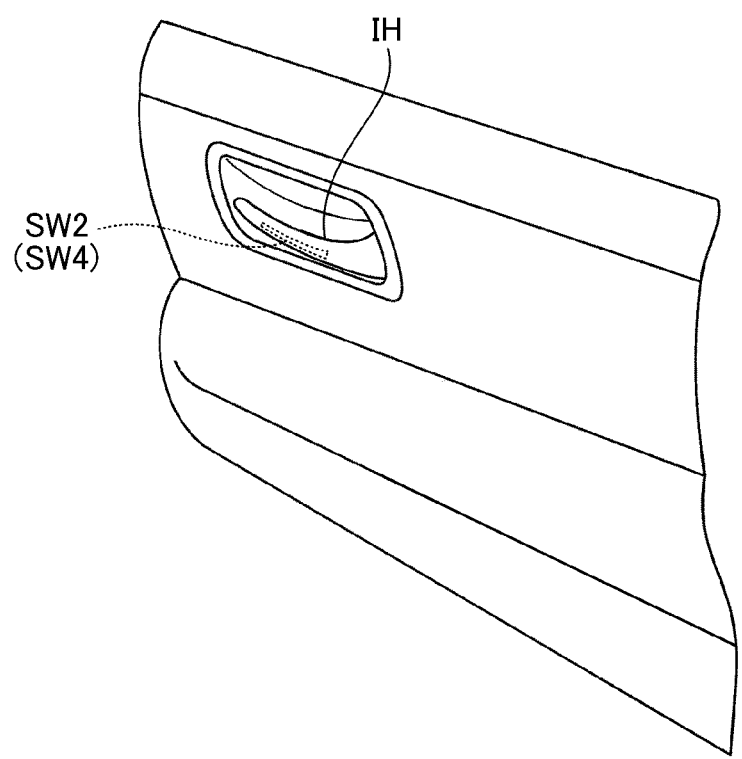

[FIG. 4]
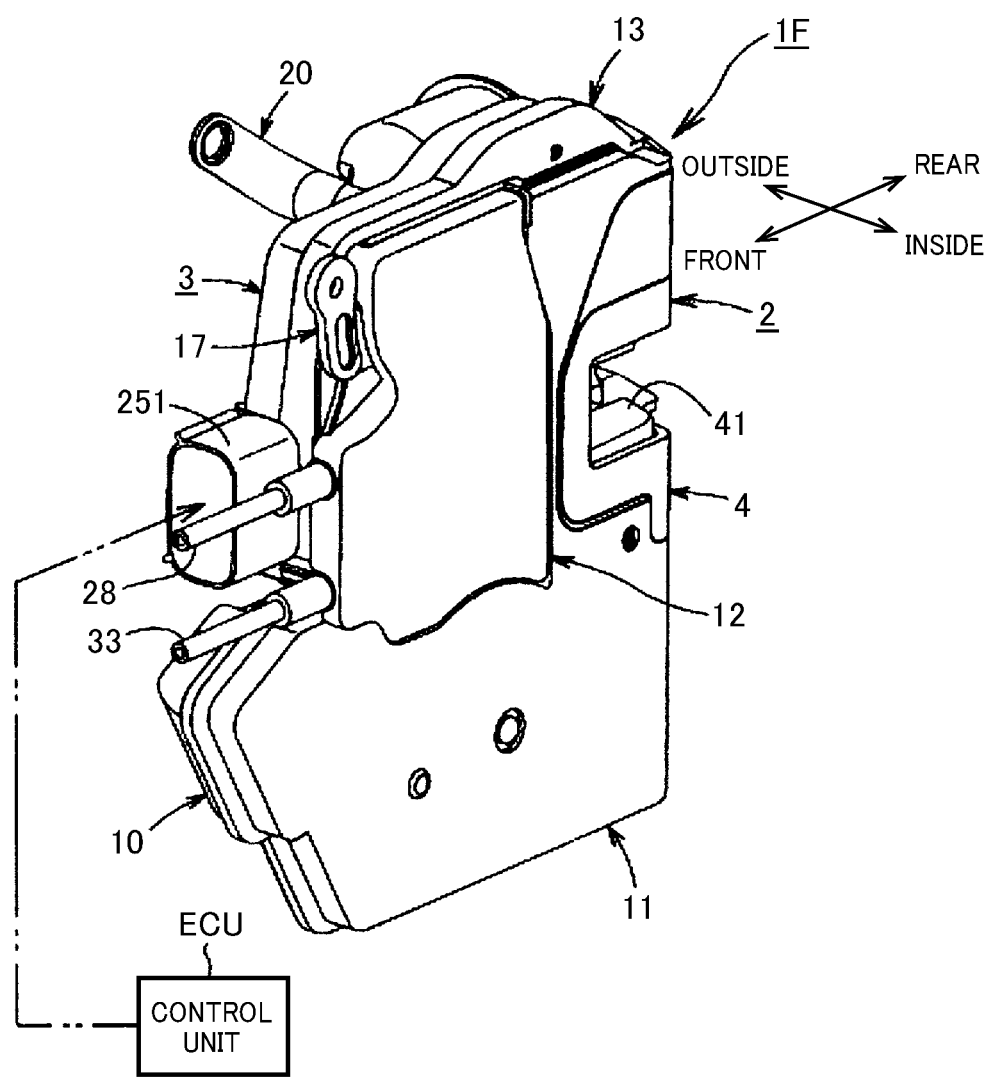

[FIG. 5]
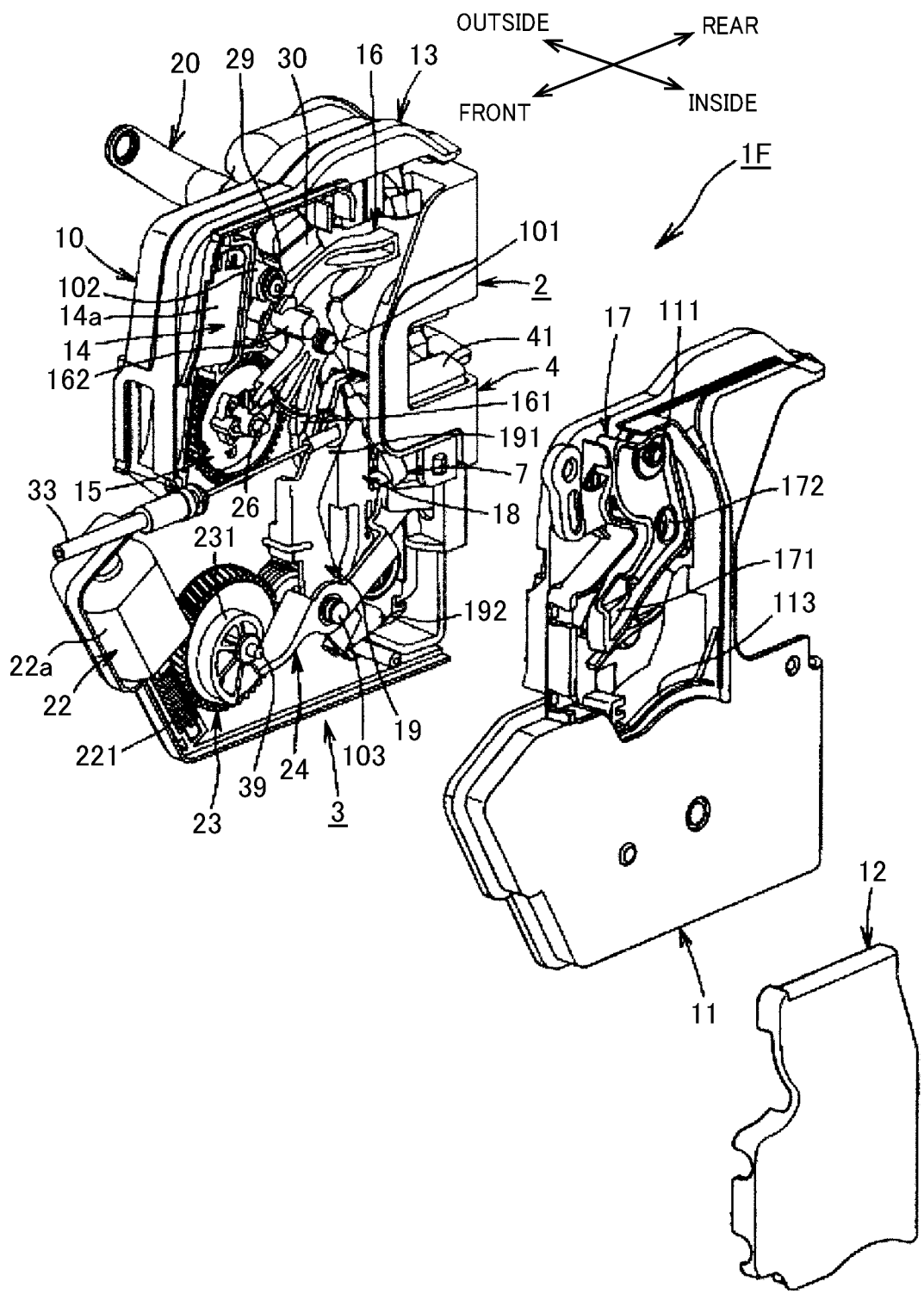

[FIG. 6]
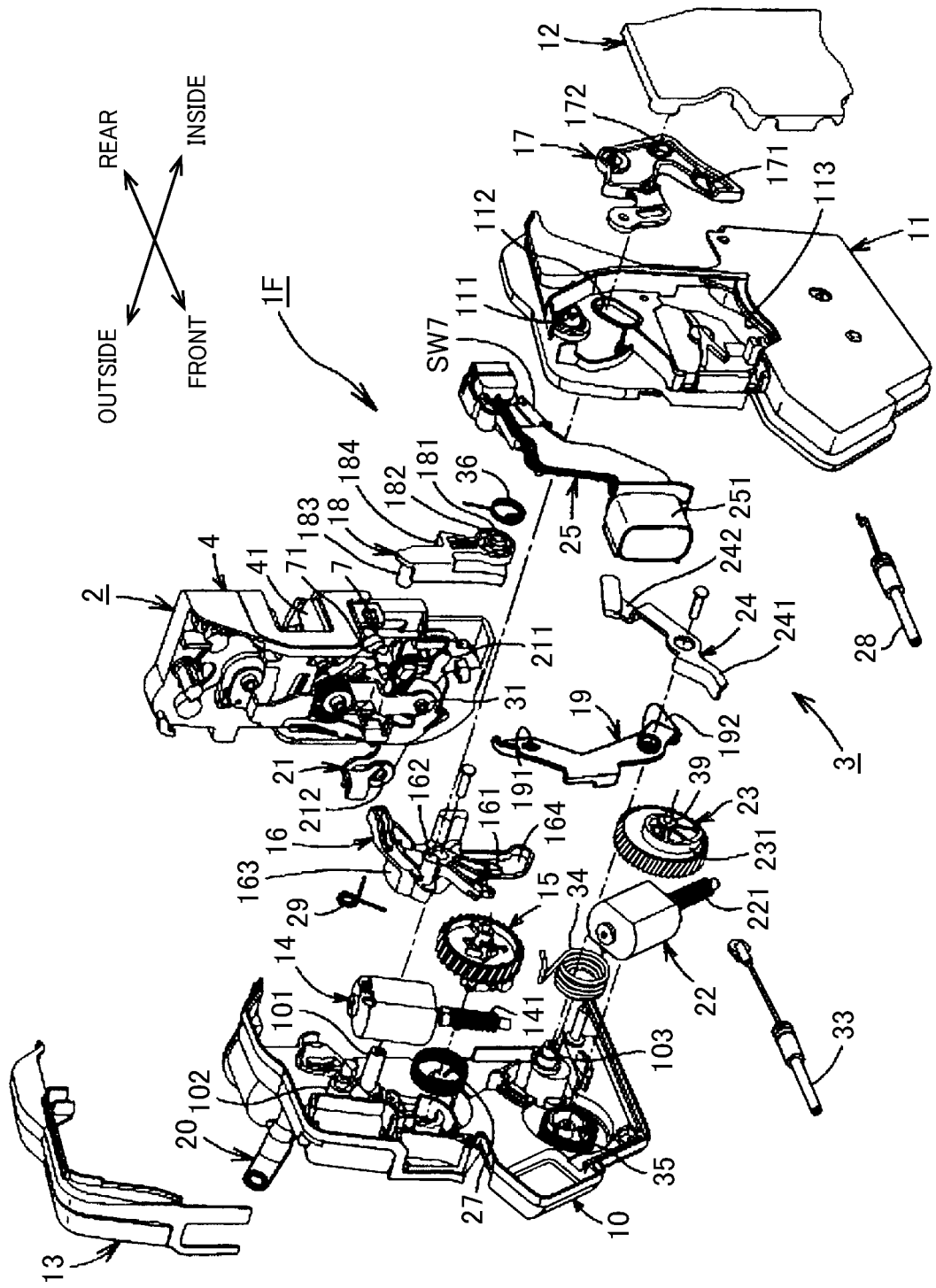

[FIG. 7]
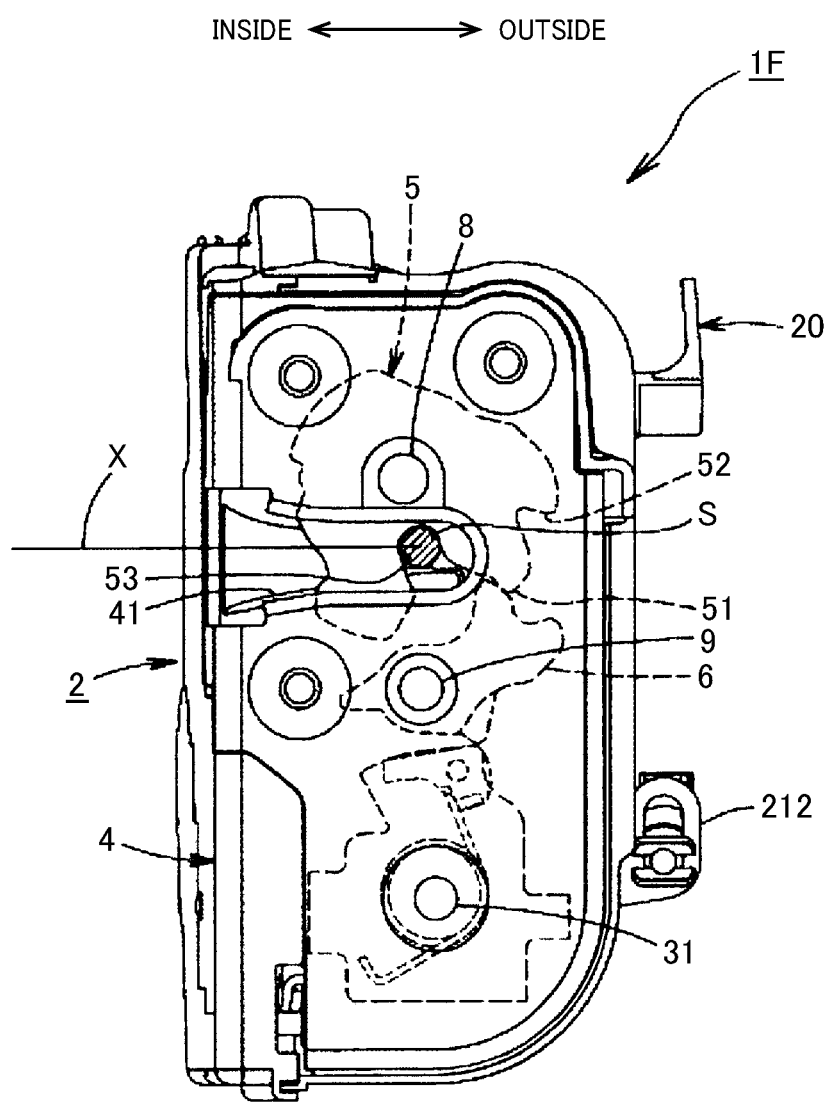

[FIG. 8]
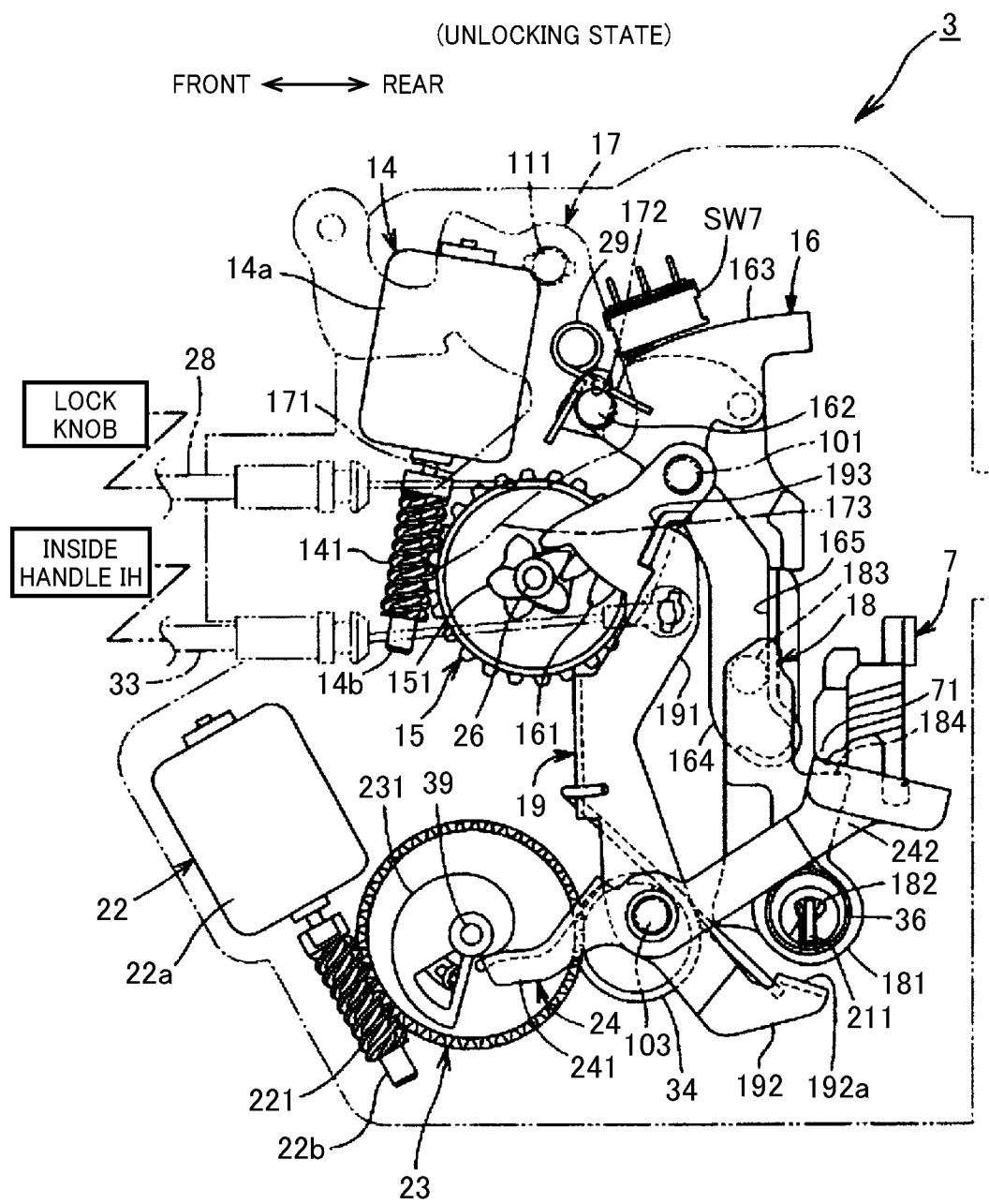

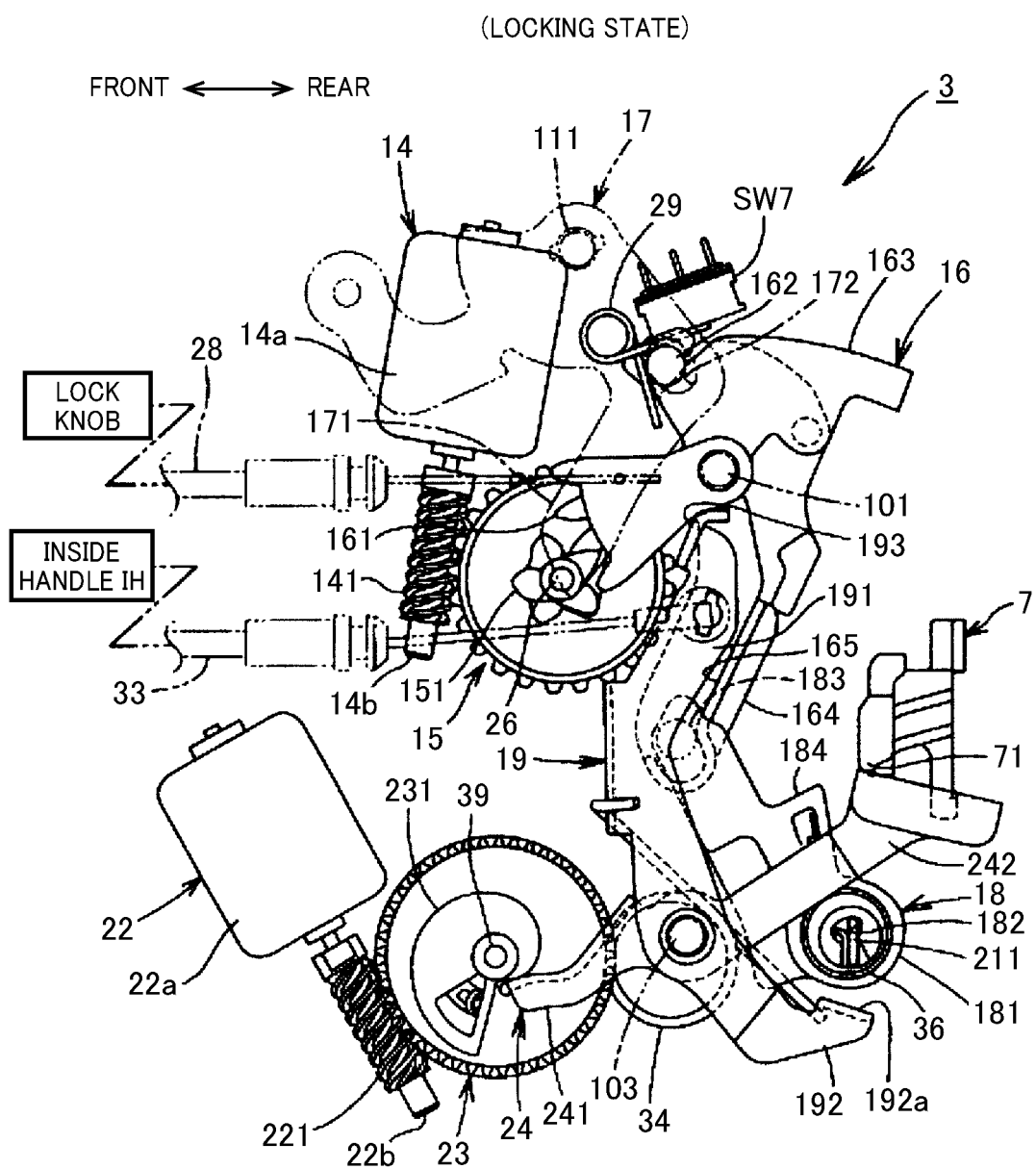

[FIG. 10]
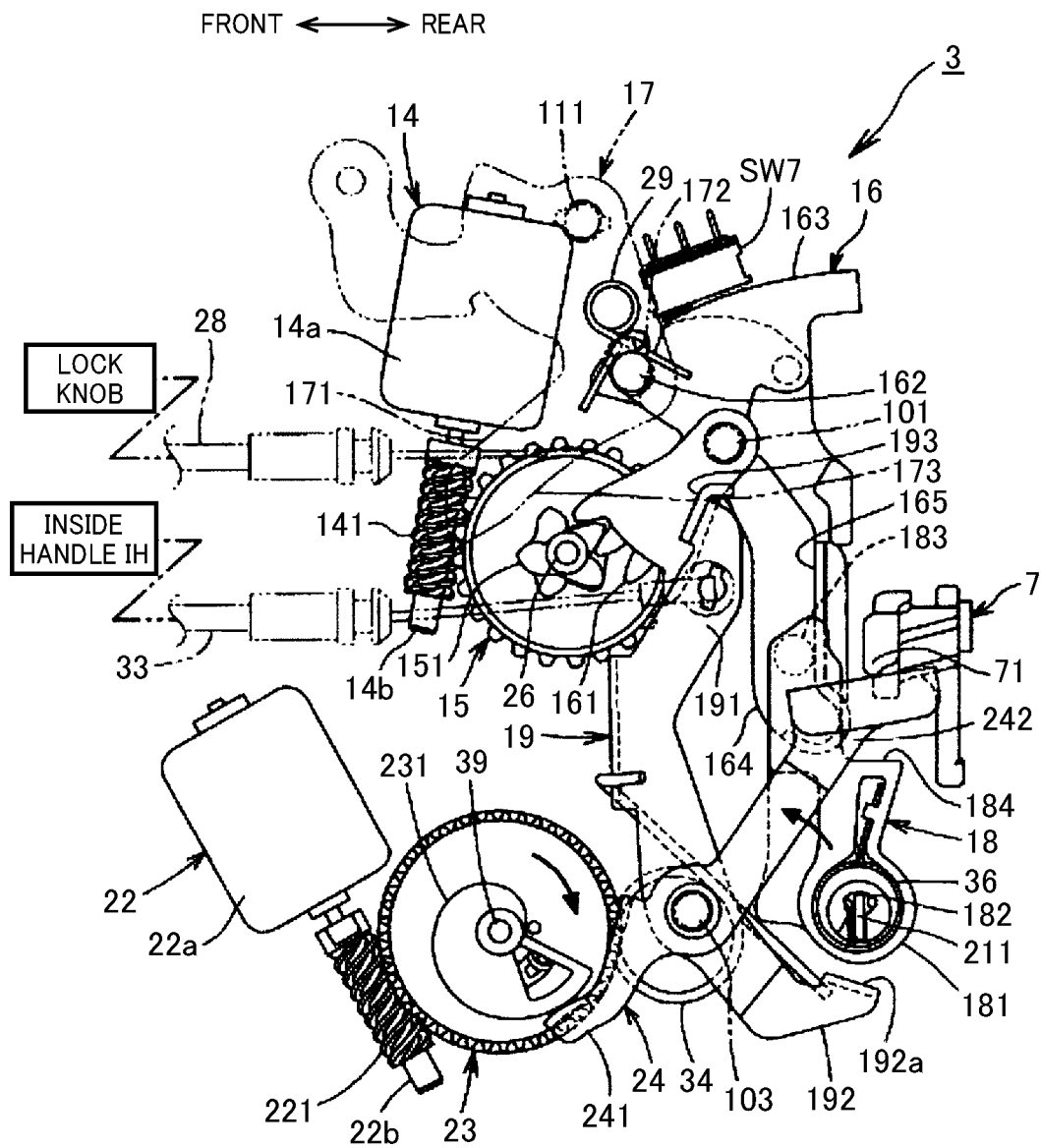

[FIG. 11]
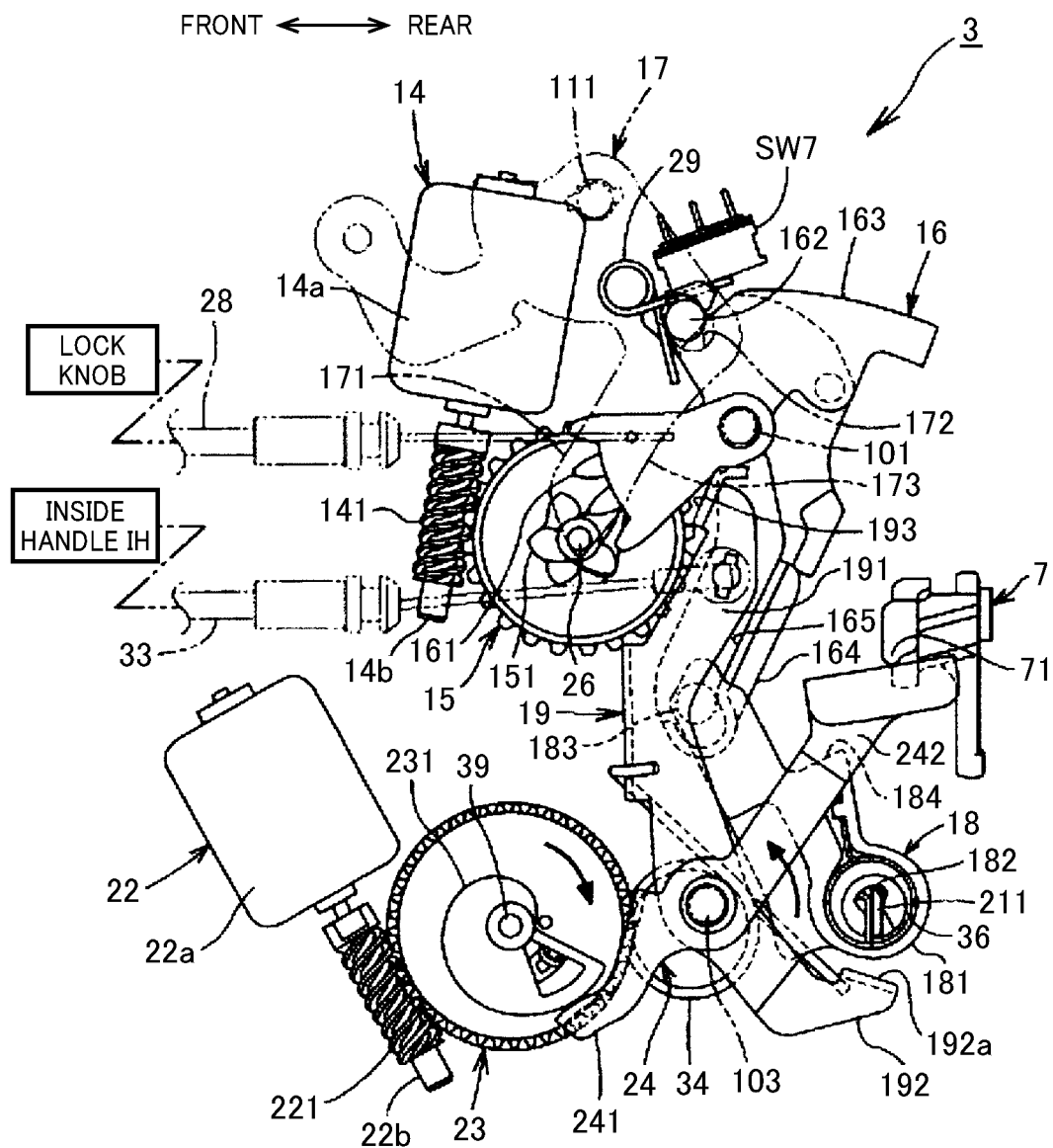

[FIG. 12]
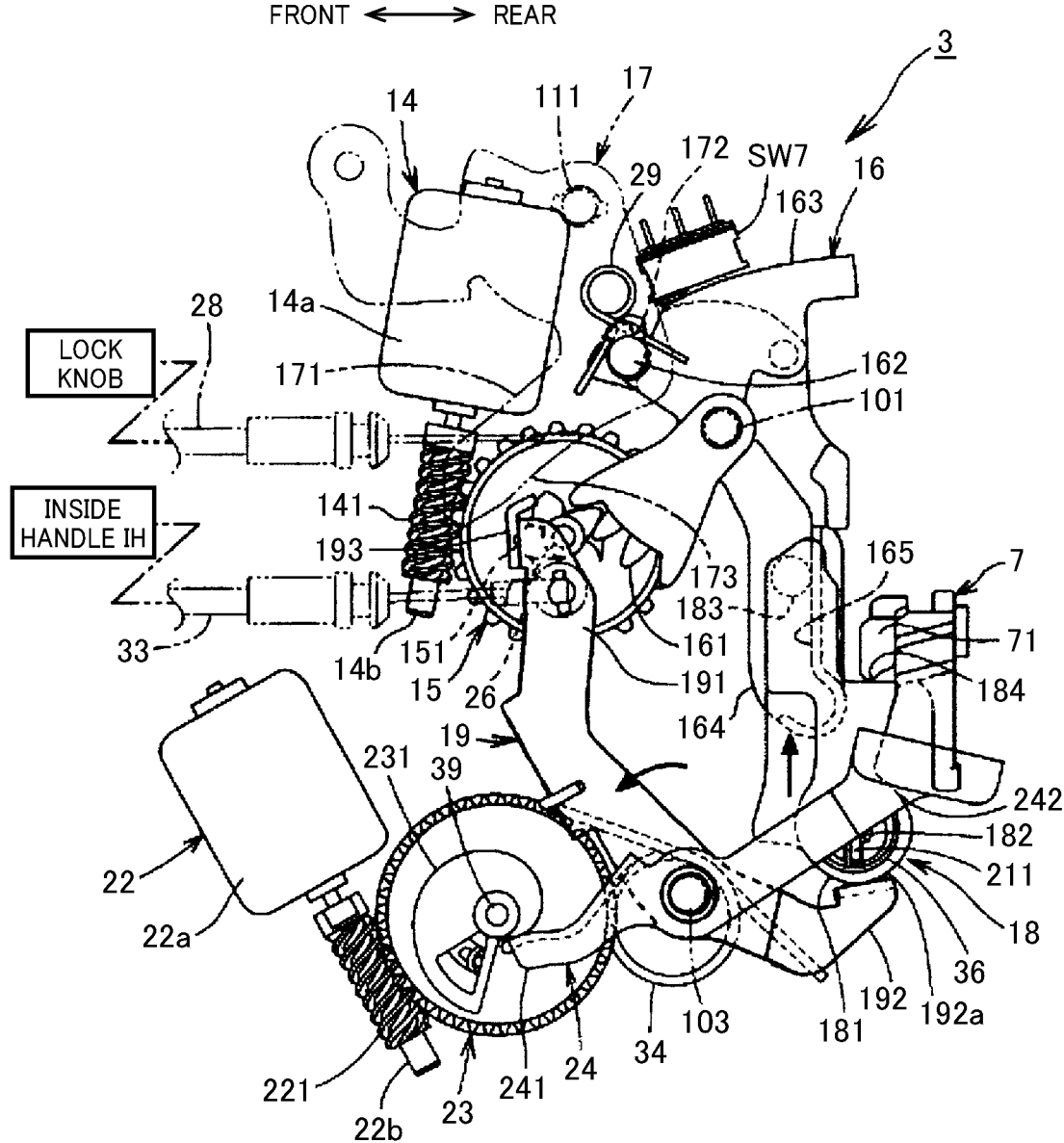

[FIG. 13]
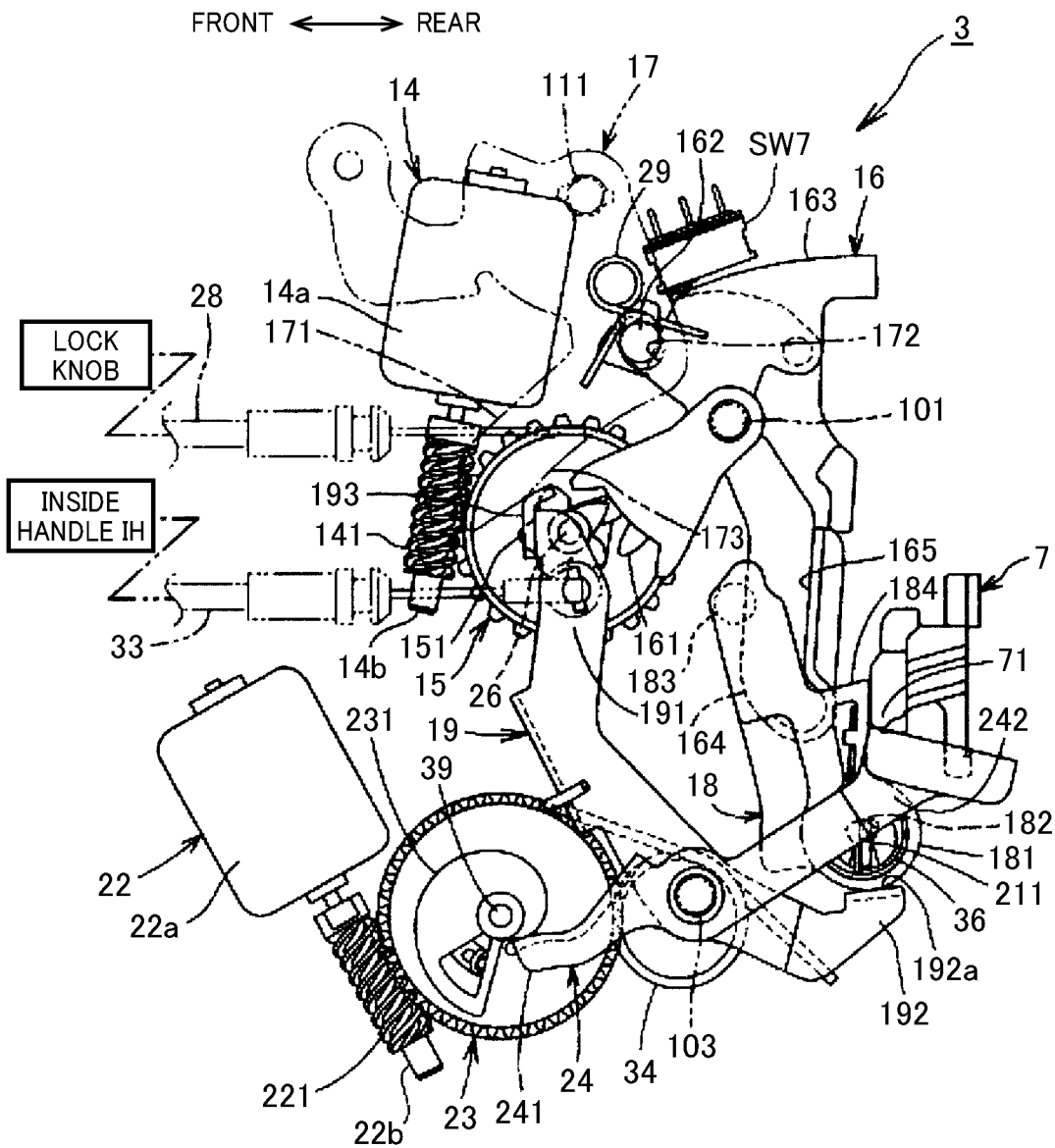

[FIG. 14]
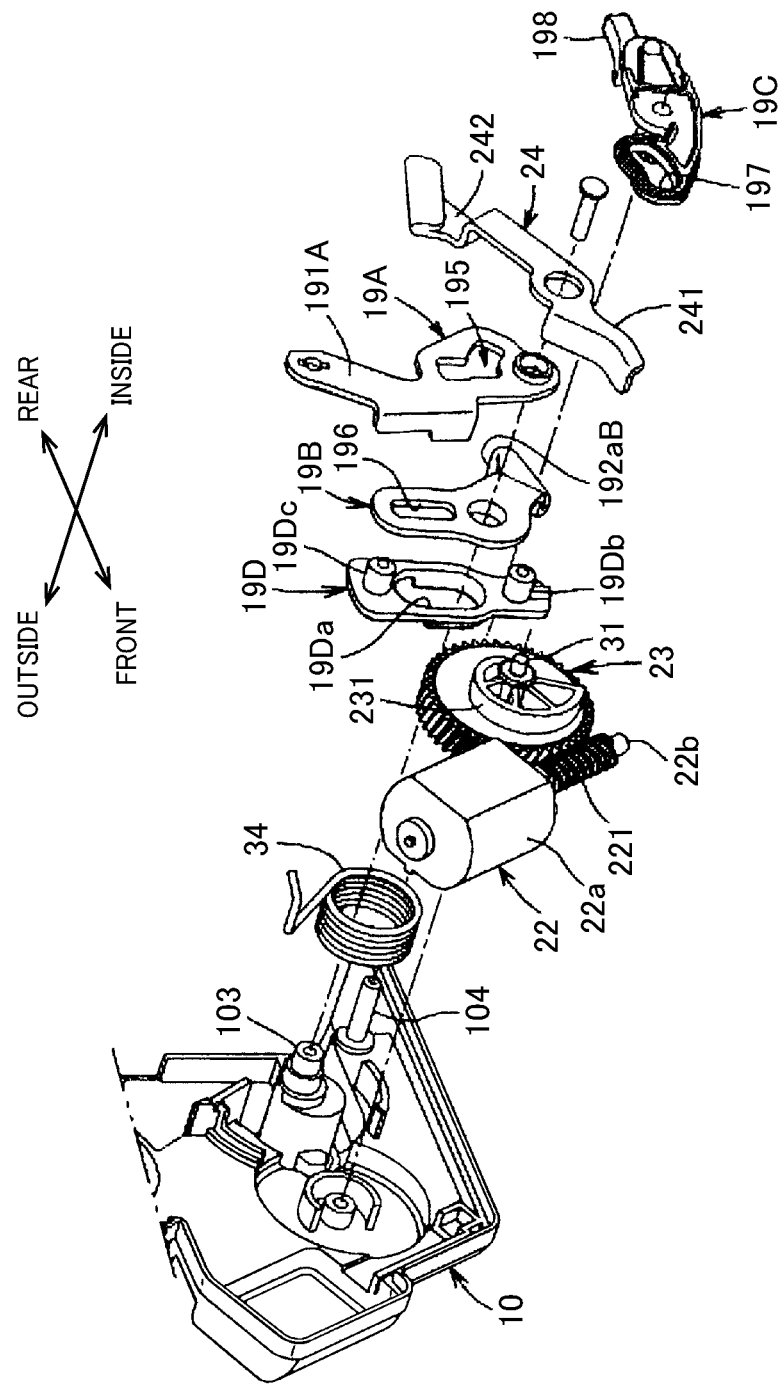

[FIG. 15]
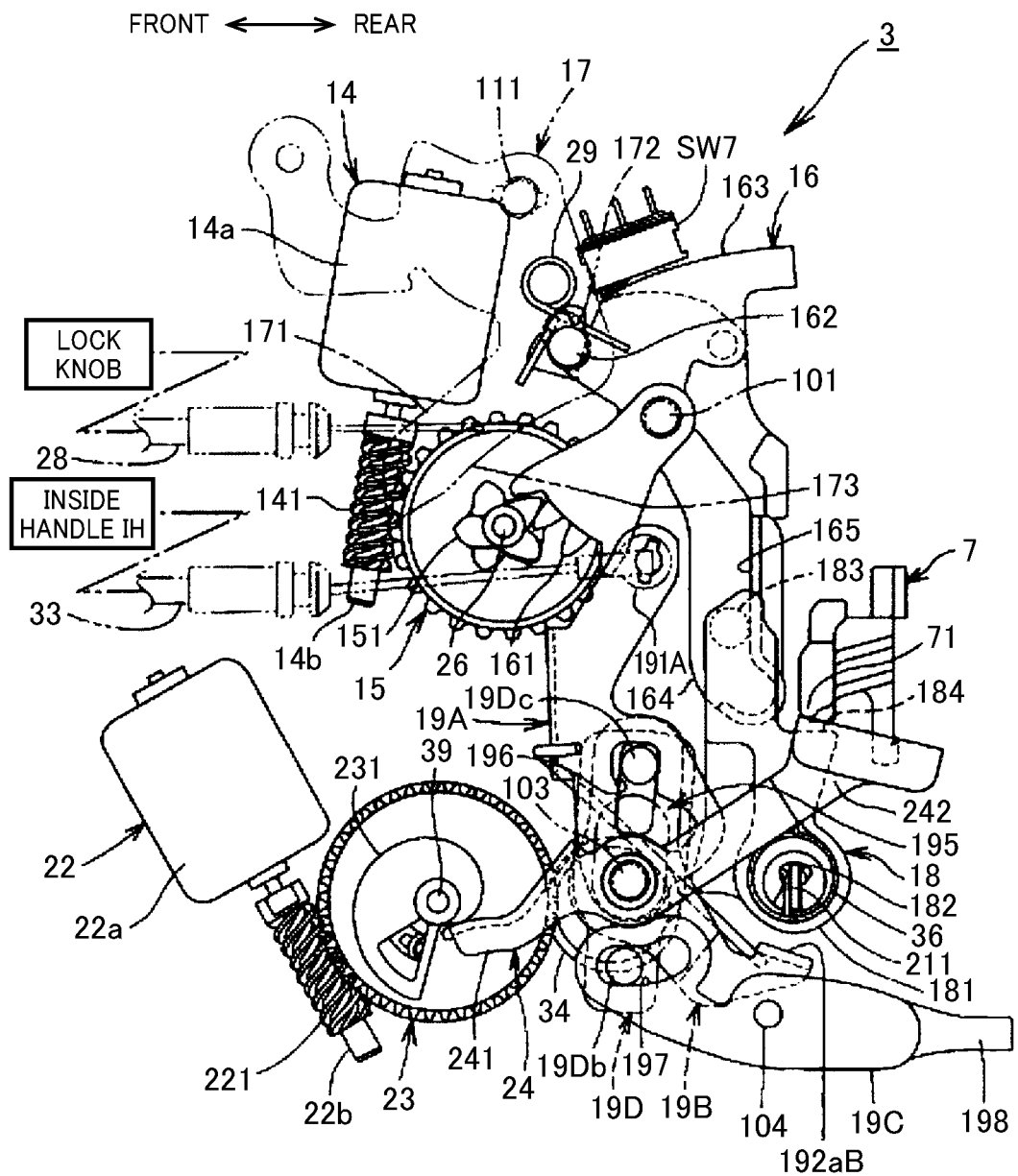

[FIG. 16]
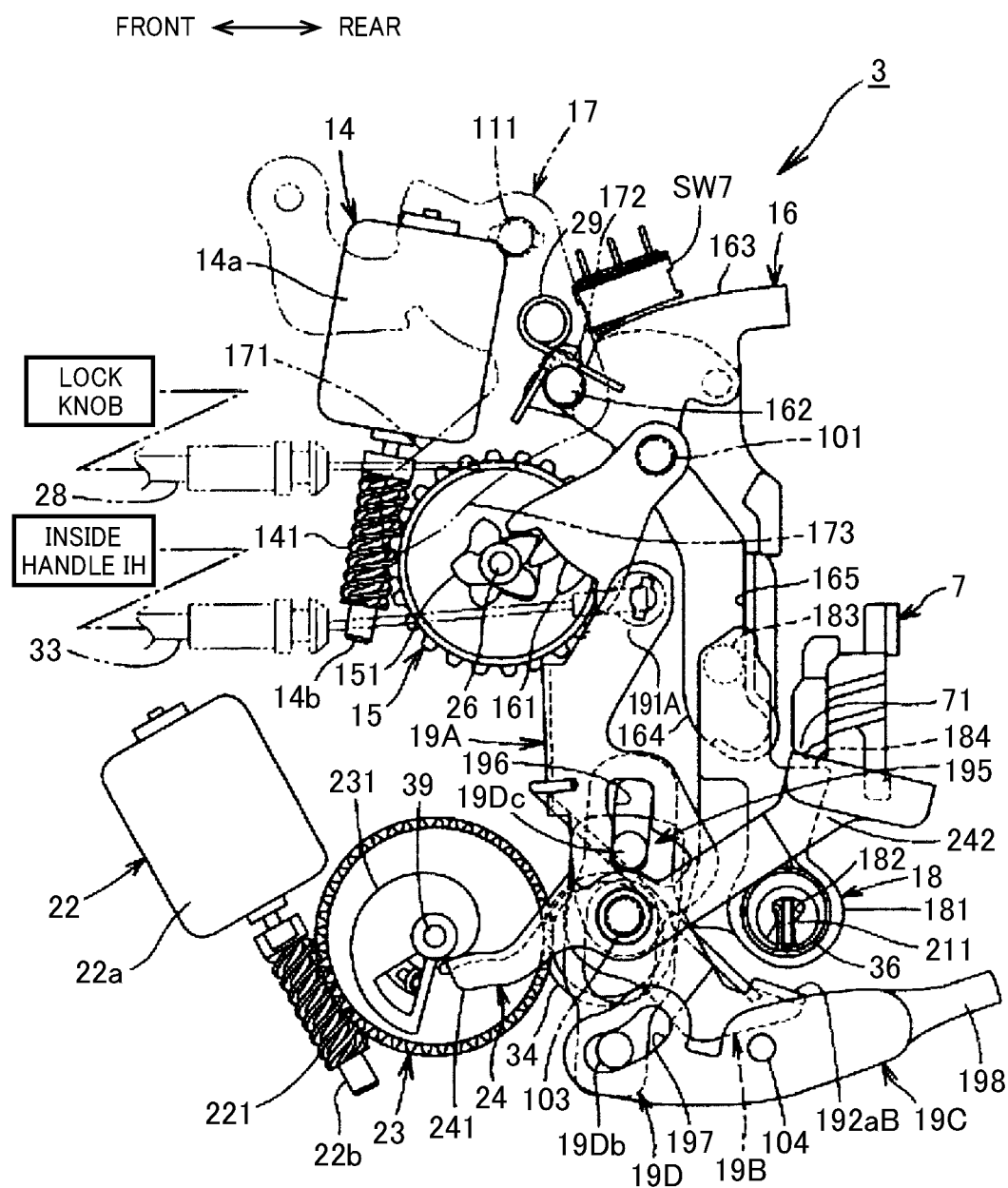

[FIG. 17]
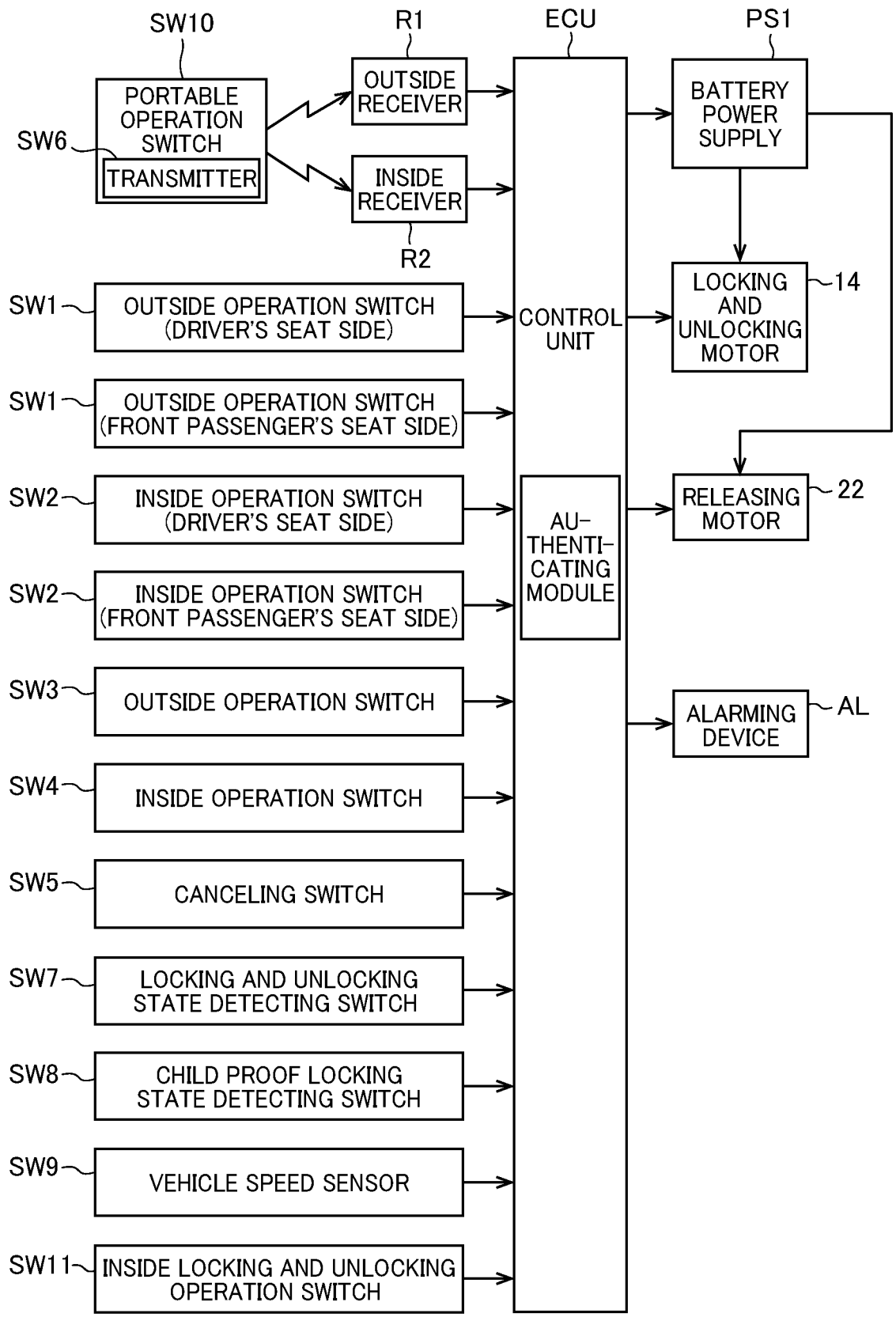

[FIG. 18]
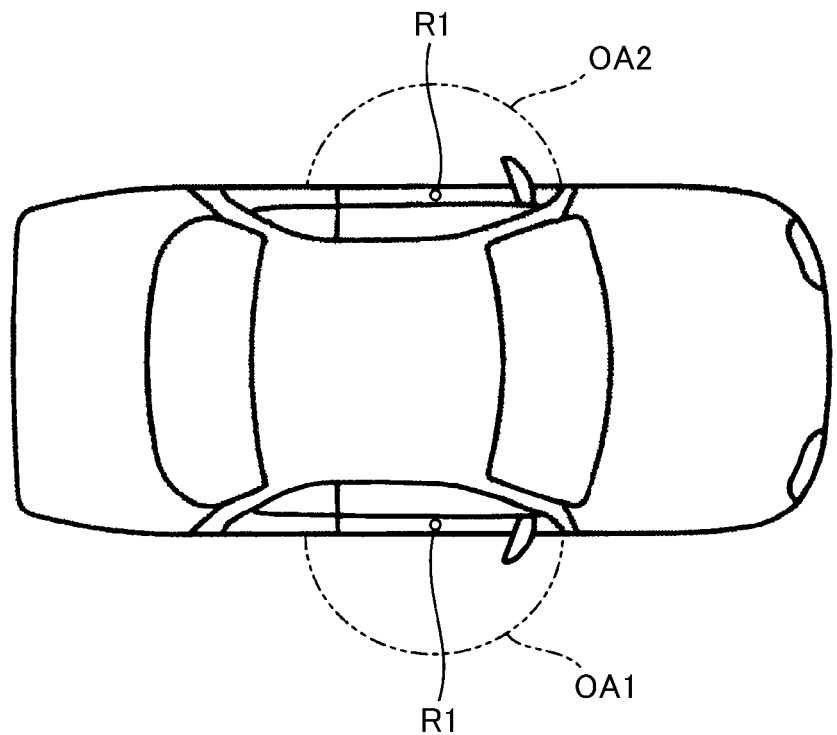
[FIG. 19]
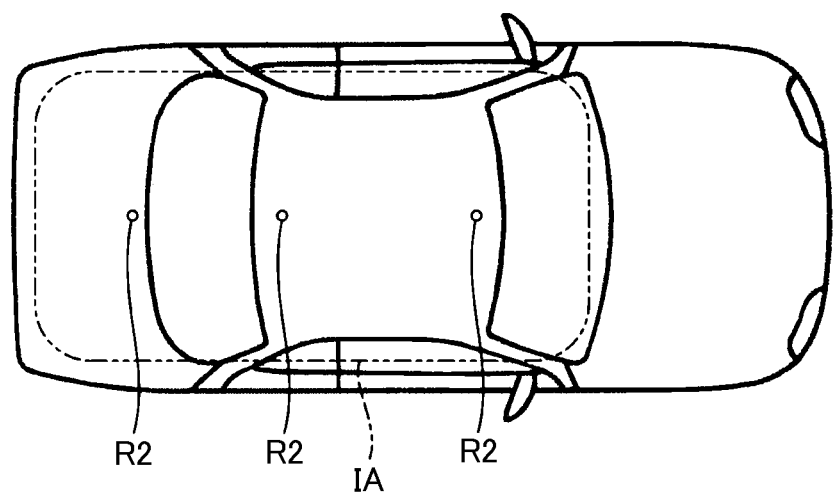

[FIG. 20]

(FRONT SIDE DOOR FD)

O : ENABLED
X : DISABLED

| | AUTHENTICATED (OUTSIDE) | | | NOT-AUTHENTICATED | | | AUTHENTICATED (INSIDE) | | | |
|---|---|---|---|---|---|---|---|---|---|---|
| PORTABLE OPERATION SWITCH SW10 | O | O | O | O | O | O | O | O | O | O |
| OUTSIDE OPERATION SWITCH (DRIVER'S SEAT SIDE) SW1 | O | O | O | O | X | X | X | X | X | X |
| OUTSIDE OPERATION SWITCH (FRONT PASSENGER'S SEAT SIDE) SW1 | O | O | O | X | X | X | X | X | X | X |
| INSIDE OPERATION SWITCH (DRIVER'S SEAT SIDE) SW2 | O | O | X | O | X | X | O | O | X | X |
| INSIDE OPERATION SWITCH (FRONT PASSENGER'S SEAT SIDE) SW2 | O | X | O | O | X | O | O | X | O | X |
| TRANSMITTER SW6 | AUTHENTICATED (OUTSIDE) | | | NOT-AUTHENTICATED | | | AUTHENTICATED (INSIDE) | | | |
| CANCELING SWITCH SW5 | UNSET | CANCEL | UNSET/CANCEL | UNSET | CANCEL | UNSET/CANCEL | UNSET | CANCEL | UNSET/CANCEL | |
| LOCKING AND UNLOCKING STATE DETECTING SWITCH SW7 | UNLOCK/LOCK | | | UNLOCK/LOCK | | | UNLOCK | LOCK | UNLOCK | LOCK | UNLOCK/LOCK |
| VEHICLE SPEED SENSOR SW9 | HALT | | | HALT | | RUNNING | HALT | | | RUNNING |

[FIG. 21]

(REAR SIDE DOOR RD)    O: ENABLED    X: DISABLED

| | Authenticated (Outside) | | | Not-Authenticated | | | | | Authenticated (Inside) | | |
|---|---|---|---|---|---|---|---|---|---|---|---|
| PORTABLE OPERATION SWITCH SW10 | O | O | O | O | O | O | O | O | X | X | X |
| OUTSIDE OPERATION SWITCH SW3 | O | O | O | O | O | X | X | X | O | X | X |
| INSIDE OPERATION SWITCH SW4 | O | X | X | X | X | O | X | X | O | X | X |
| TRANSMITTER SW6 | AUTHENTICATED (OUTSIDE) ||| NOT-AUTHENTICATED ||||| AUTHENTICATED (INSIDE) |||
| CANCELING SWITCH SW5 | UNSET | CANCEL | UNSET/CANCEL | UNSET | CANCEL | UNSET | CANCEL | UNSET/CANCEL | UNSET | CANCEL | UNSET/CANCEL |
| LOCKING AND UNLOCKING STATE DETECTING SWITCH SW7 | UNLOCK/LOCK || | UNLOCK/LOCK | UNLOCK/LOCK || | UNLOCK/LOCK | UNLOCK/LOCK || |
| CHILD PROOF LOCKING STATE DETECTING SWITCH SW8 | UNLOCK | LOCK | UNLOCK/LOCK | UNLOCK | LOCK | UNLOCK | LOCK | UNLOCK/LOCK | UNLOCK | LOCK | UNLOCK/LOCK |
| VEHICLE SPEED SENSOR SW9 | HALT | HALT | RUNNING | HALT | RUNNING | HALT | HALT | RUNNING | HALT | HALT | RUNNING |

[FIG. 22]
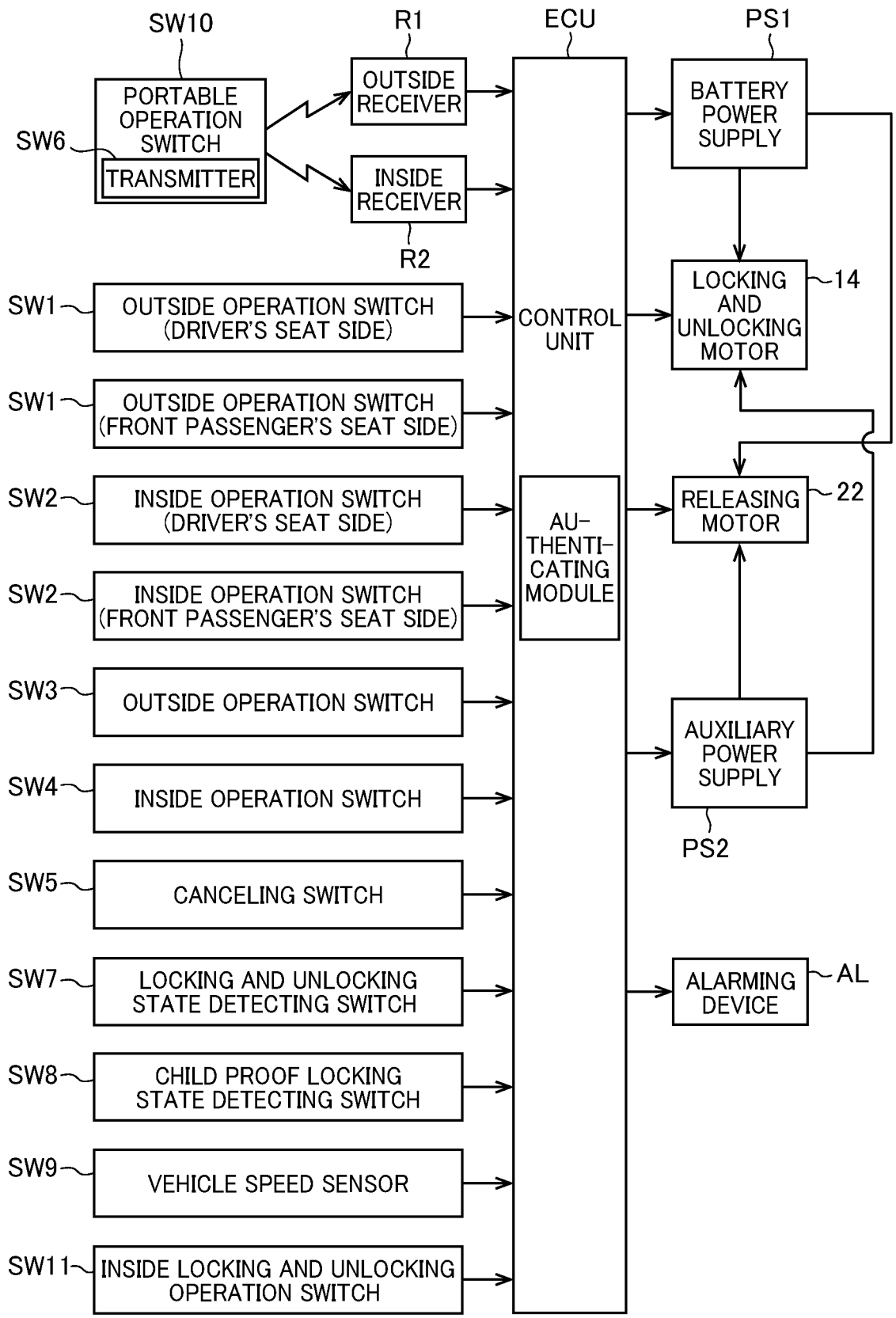

AUTOMOBILE DOOR LOCKING DEVICE

CROSS-REFERENCE TO RELATED APPLICATION

This is a U.S. national stage application claiming the benefit of International Patent Application No. PCT/JP2015/084305 filed Dec. 7, 2015, the entire content of which is incorporated herein by reference.

TECHNICAL FIELD

The present invention relates to a motor vehicle door lock apparatus.

BACKGROUND ART

A motor vehicle door lock apparatus described in PTL 1 receives a remote control signal transmitted from a transmitter carried by a user to lock or unlock a door of a vehicle and executes a door locking (lock) operation or a door unlocking (unlock) operation according to the received remote control signal, informing the user that the required operation is completed by emitting a buzzing sound from a buzzer or flashing a lamp.

A motor vehicle door lock apparatus described in PTL 2 authenticates a portable device that a user carries by transmitting and receiving a signal between the portable device and itself and executes a door unlocking operation when a hand of the user moves nearer to a door of the motor vehicle with the portable device authenticated on the understanding that the user intends to unlock the door in the case where the door is locked, whereas in the case where the door is unlocked, the motor vehicle lock apparatus executes a door locking operation on the understanding that the user intends to lock the door.

CITATION LIST

Patent Literature

PTL 1: JP-A-2002-129794
PTL 2: JP-A-2015-63876

SUMMARY OF INVENTION

Technical Problem

When the user leaves the motor vehicle, the doors are normally locked. To lock the doors, in the motor vehicle door lock apparatus described in PTL 1, the user needs to execute a locking operation using the transmitter, and in the motor vehicle door lock apparatus described in PTL 2, the user needs to move his or her hand towards the door. In the event that the user forgets to perform them, there are caused fears that the user moves away from the motor vehicle, leaving the doors unlocked.

The invention has been made in view of these situations, and an object thereof is to provide a motor vehicle door lock apparatus which can not only prevent a user from leaving his or her motor vehicle with doors of the motor vehicle left unlocked but also enhance convenience in getting out of the motor vehicle.

Solution to Problem

A motor vehicle door lock apparatus according to one illustrative aspect of the invention comprises: a meshing mechanism configured to mesh with a striker to hold a door in a closed state; a locking and unlocking mechanism configured to be selectively switched to an unlocking state where a meshing of the meshing mechanism can be released and a locking state where a meshing of the meshing mechanism cannot be released by a locking and unlocking motor as a drive source being driven; an outside electric operation element provided on an outer side of the door; a control unit configured to authenticate a transmitter based on a signal emitted by the transmitter, wherein in a case where the transmitter is situated outside a vehicle, the control unit is configured to: enable an operation of the outside electric operation element when the transmitter is authenticated; and disable the operation of the outside electric operation element when the transmitter is not authenticated; and an electric releasing mechanism configured to release a meshing of the meshing mechanism by the control unit driving a releasing motor to activate a releasing operation based on the operation of the outside electric operation element when the control unit authenticates the transmitter outside the motor vehicle, wherein the control unit is configured to: in a case where the transmitter outside the motor vehicle is disposed within a predetermined area on the outer side of the door, authenticate the transmitter; and in response to the transmitter outside the motor vehicle being switched from the authenticated state to a non-authenticated state when the transmitter is dislocated from the predetermined area, drive the locking and unlocking motor to activate a locking operation so as to switch the locking and unlocking mechanism to the locking state.

Advantageous Effect of Invention

According to the invention, it is possible to provide the motor vehicle lock apparatus which can not only prevent the user from leaving his or her motor vehicle with the doors left unlocked but also enhance the convenience in getting out of the motor vehicle.

BRIEF DESCRIPTION OF DRAWINGS

FIG. 1 is a side view of a motor vehicle including a door lock apparatus according to the invention.
FIG. 2 is a perspective view of an outer side of a door.
FIG. 3 is a perspective view of an inner side of the door.
FIG. 4 is a perspective view of a door lock apparatus for a front side door.
FIG. 5 is a partially exploded perspective view of the front side door's door lock apparatus.
FIG. 6 is an exploded perspective view of the front side door's door lock apparatus.
FIG. 7 is a rear view of the front side door's door lock apparatus.
FIG. 8 is a side view of a main part of the front side door's door lock apparatus when a locking and unlocking mechanism thereof is in an unlocking state.
FIG. 9 is a side view of the main part of the front side door's door lock apparatus when the locking and unlocking mechanism is in a locking state.
FIG. 10 is a side view of the main part of the front side door's door lock apparatus when an electrical releasing operation is performed with the locking and unlocking mechanism in the unlocking state.
FIG. 11 is a side view of the main part of the front side door's door lock apparatus when the electrical releasing operation is performed with the locking and unlocking mechanism in the locking state.

FIG. 12 is a side view of the main part of the front side door's door lock apparatus when a manual releasing operation is performed with the locking and unlocking mechanism in the unlocking state.

FIG. 13 is a side view of the main part of the front side door's door lock apparatus when the manual releasing operation is performed with the locking and unlocking mechanism in the locking state.

FIG. 14 is an exploded perspective view of a main part of a door lock apparatus for a rear side door.

FIG. 15 is a side view of the main part of the rear side door's door lock apparatus when a locking and unlocking mechanism thereof is in an unlocking state and a child proof mechanism thereof is in a child unlocking state.

FIG. 16 is a side view of the main part of the rear side door's door lock apparatus when the locking and unlocking mechanism is in the unlocking state and the child proof mechanism is in a child locking state.

FIG. 17 is a block diagram of a control circuit.

FIG. 18 is a plan view showing authenticating areas of transmitters situated outside the motor vehicle.

FIG. 19 is a plan view showing authenticating areas of transmitters situated inside the motor vehicle.

FIG. 20 is an explanatory chart showing relationships between electric operation elements and switches of the front side door.

FIG. 21 is an explanatory chart showing relationships between electric operation elements and switches of the rear side door.

FIG. 22 is a block diagram showing a modified example of a control circuit.

DESCRIPTION OF EMBODIMENTS

As shown in FIG. 1, a front side door FD of a motor vehicle V of a four-door sedan type has disposed therein or thereon a front side door's door lock apparatus 1F for holding the front side door FD in a closed position, an outside handle OH that is an outside mechanical operation element and an outside operation switch SW1 that is an outside electric operation element both of which are provided outside the vehicle, an inside handle IH that is an inside mechanical operation element and an inside operation switch SW2 that is an inside electric operation element both of which are provided inside the vehicle, a key cylinder KC for selectively switching a locking and unlocking mechanism, which will be described later, of the door lock apparatus 1F between a locking state and an unlocking state from the outside of the vehicle, and a lock knob (whose illustration is omitted) for selectively switching the locking and unlocking mechanism between the locking state and the unlocking state from the inside of the vehicle.

A rear side door RD has disposed therein or thereon a rear side door's door lock apparatus 1R for holding the rear side door RD in a closed position, an outside handle OH that is an outside mechanical operation element and an outside operation switch SW3 that is an outside electric operation element both of which are provided outside the vehicle, an inside handle IH that is an inside mechanical operation element and an inside operation switch SW4 that is an inside electric operation element both of which are provided inside the vehicle, and a lock knob (whose illustration is omitted) for selectively switching a locking and unlocking mechanism of the rear side door's door lock apparatus 1R between a locking state and an unlocking state from the inside of the vehicle. It should be noted that there may be a case where the lock knobs of the front side door FD and the rear side door RD are omitted depending on a specification of the motor vehicle V.

A canceling switch SW5 and an inside locking and unlocking operation switch SW11 are provided at a location (for example, a location situated near a driver's seat inside a passenger compartment or a location situated on an inner surface of the front side door FD) where a driver in the driver's seat can operate the switches. The canceling switch SW5 is configured to enable or disable operations of inside operation switches SW2, SW4 in the other remaining side doors than the front side door for the driver's seat, that is, the canceling switch SW5 is configured to make the operations of the inside operation switches SW2, SW4 effective or ineffective. The inside locking and unlocking operation switch SW11 is configured to switch the locking and unlocking mechanisms of all the side doors between the locking state and the unlocking state altogether from the inside of the vehicle.

The outside operation switches SW1, SW3 are disposed on front surfaces of the outside handles OH, respectively, as shown in FIG. 2, for example, or are disposed on rear surfaces of the outside handles OH or in the vicinity thereof. The inside operation switches SW2, SW4 are disposed on front surfaces of the inside handles IH, respectively, as shown in FIG. 3, for example, or are disposed on rear surfaces of the inside handles IH or in the vicinity thereof. In this embodiment, the operation switches SW1 to SW4 are each made up of an electrostatic capacitance type touch switch for detecting a touch of a finger of a user. However, the invention is not limited thereto, and hence, the operation switches SW1 to SW4 may each be configured as a proximity switch for detecting an approach of part of a human body.

The outside operation switches SW1, SW3 are electrically controlled by a control unit ECU (Electronic Control Unit) that is mounted on the motor vehicle V. The control unit ECU enables an operation performed by a proper user (a driver) who carries a transmitter (or an electronic key) SW6 provided exclusively for the motor vehicle when the control unit ECU verifies that the proper user has approached the motor vehicle V as a result of the proper user approaching to enter a predetermined area relative to the motor vehicle V and an ID signal sent and received being collated to be found identical with a proper ID signal through a radio communication between the transmitter SW6 and one of outside receivers R1 disposed on outer sides of a vehicle body.

In addition to the outside receivers R1, inside receivers R2 are provided on the motor vehicle V so as to be disposed inside the passenger compartment. The outside receivers R1 can receive a signal from the transmitter SW6 that is situated in predetermined areas outside the vehicle, and the inside receivers R2 can receive a signal from the transmitter SW6 that is situated inside the vehicle.

The transmitter SW6 is incorporated in a portable operation switch SW10 for radio communication that is an outside electric operation element carried by the user or is configured as a separate device from the portable operation switch SW10. The portable operation switch SW10 has an opening switching module operated to open the corresponding door and a locking and unlocking switching module operated when switching modes of the locking and unlocking mechanism. The opening switching module is allocated to each door, and the locking and unlocking switching module is used commonly for all the doors. The operations of the opening switching module and the locking and unlocking switching module are made enabled when the ID signal of the transmitter SW6 is authenticated and disabled when the ID signal of the transmitter SW6 is not authenticated.

FIG. 4 is an external perspective view of the door lock apparatus 1F, FIG. 5 is a partially exploded perspective view of the door lock apparatus 1F, FIG. 6 is an exploded perspective view of the door lock apparatus 1F, FIG. 7 is a rear view of the door lock apparatus 1F, and FIGS. 8 to 13 are explanatory drawings illustrating operations of a main part of the door lock apparatus 1F.

Directions used in the following description denotes directions resulting when the door lock apparatuses 1F, 1R are mounted in the doors.

The door lock apparatus 1F includes a meshing unit 2 mounted within the front side door FD and having a meshing mechanism for holding the front side door FD in a closed position by being brought into meshing engagement with a striker S provided on a vehicle body side and an operation unit 3 having a locking and unlocking mechanism made up of mechanical elements (a lever, a link and the like) enabling the front side door FD to be selectively switched to a locked state or an unlocked state.

As shown in, for example, FIG. 7, the meshing unit 2 has, as main constituent elements, a body 4 that is fixed to a rear end portion of the front side door FD inside the same door with a plurality of bolts (whose illustration is omitted), a meshing mechanism (with no reference numeral) accommodated within the body 4 and including a latch 5 capable of meshing with the striker S fixed to the vehicle body side and a ratchet 6 capable of engaging with the latch 5, and an opening lever 7 (refer to, for example, FIG. 6) capable of performing a releasing operation in a direction in which an engagement relationship of the ratchet 6 with the latch 5 is released.

The latch 5 is rotatably supported by a latch shaft 8 directed to extend in a front and rear direction within the body 4 and has a full latch engaging portion 51 and a half latch engaging portion 52 with both of which the ratchet 6 can engage and a meshing groove 53 capable of meshing with the striker S that enters a striker entrance groove 41 provided in the body 4.

As shown in FIG. 7, the striker entrance groove 41 in the body 4 is provided slightly upwards of a substantially central portion of the body 4 in an up and down or vertical direction and is shaped so that the groove extends towards the outside of the vehicle while being opened to the inside of the vehicle at an inboard end thereof. A reference sign or character "X" shown in FIG. 7 denotes a striker entrance line that is a striker entrance path along which the striker S enters the striker entrance groove 41 to be brought into meshing engagement with the meshing groove 53 when the front side door FD is closed.

In addition, as the front side door FD is closed, the latch 5 rotates through a predetermined angle in a counterclockwise direction against a biasing force of a spring (whose illustration is omitted) from an open position (a position situated substantially 90 degrees away from a position shown in FIG. 7 in a clockwise direction) that corresponds to an open state of the front side door FD where the front side door FD does not mesh with the striker S to arrive at a full latching position (the position shown in FIG. 7) that corresponds to a fully closed state of the front side door FD where the meshing groove 53 meshes with the striker S that enters the striker entrance groove 41 from the left in FIG. 7 along the striker entrance line X after passing a half latching position that corresponds to a half closed state of the front side door FD where the meshing groove 53 slightly meshes with the striker S. On the contrary, the latch 5 rotates reversely as the striker S withdraws from the striker entrance groove 41 as a result of the front side door FD being opened.

The ratchet 6 is situated below the striker entrance groove 41 and is rotatably supported by a ratchet shaft 9 directed to extend in the front and rear direction within the body 4. The ratchet 6 is biased in an engaging direction (in a counterclockwise direction in FIG. 7 in which the ratchet 6 engages with either of the full latch engaging portion 51 and the half latch engaging portion 52 of the latch 5) by a spring to be brought into engagement with the full latch engaging portion 51 to thereby hold the front side door FD in the fully closed state and to be brought into engagement with the half latch engaging portion 52 to thereby hold the front side door FD in the half closed state.

As shown in FIG. 6, the opening lever 7 is rotatably supported on a front surface side of the body 4 and coaxially with the ratchet 6 so as to rotate together with the ratchet 6 and performs the releasing operation (rotates in a counterclockwise direction in FIG. 6) to thereby release the engagement relationship between the ratchet 6 and the latch 5. A released portion 71 is provided at an end portion of the opening lever 7 that extends into the inside of the vehicle.

Next, the operation unit 3 will be described.

As shown in FIG. 6, the operation unit 3 has a first synthetic resin cover 10, having substantially an L-shape when seen from a top side thereof, that is fixed to the body 4 so as to cover a front surface of the body 4, a second synthetic resin cover 11 configured to close a side surface of the first cover 10 that faces the inside of the vehicle, a synthetic resin waterproof side cover 12 configured to close a substantially upper half portion of the second cover 11 from the inside of the vehicle, a waterproof top cover 13 covering an upper mating surface between the first cover 10 and the second cover 11, and an operation mechanism (with no reference numeral) that is accommodated within an inside portion of a housing.

When referred to in this invention, the "inside portion of the housing" denotes an accommodating space defined between a side surface of the first cover 10 that is substantially at right angles to the front surface of the body 4 and a side surface of the second cover 11 that faces the side surface of the first cover 10.

The operation mechanism includes a locking and unlocking motor 14 as a drive source for the locking and unlocking mechanism, a locking and unlocking worm wheel 15 that can be driven to rotate backwards and forwards by the locking and unlocking motor 14, a locking lever 16 that can move to an unlocking position where a door opening operation of the outside handle OH is enabled and a locking position where the door opening operation of the outside handle OH is disabled, an opening link 18 that can move to an unlocking position and a locking position, an inside lever 19 that is linked with the inside handle IH, a key lever 20 that is coupled to the key cylinder KC, an outside lever 21 that is linked with the outside handle OH, a releasing motor 22 as a drive source for an electric releasing mechanism, a releasing worm wheel 23 that can be driven to rotate by the releasing motor 22, an electric releasing lever 24 that performs a releasing operation (for example, a counterclockwise rotational operation in FIG. 8) as the releasing worm wheel 23 rotates, and a wiring plate 25 having applied thereto wiring that is electrically connected to the locking and unlocking motor 14, the releasing motor 22 and various types of switches. Additionally, a knob lever 17 is provided in an accommodating space defined between the second cover 11 and the waterproof side cover 12, and this knob lever 17 is linked with a lock knob for manual operation provided on an inner side of the front side door FD. It should be noted that in the case where the lock knob is omitted, the knob lever 17 is also omitted.

In this embodiment, the locking and unlocking mechanism includes the locking and unlocking motor 14 as the drive source therefor, the locking and unlocking worm wheel 15 that is a mechanical element, the locking lever 16 and the opening link 18.

Additionally, when referred to in the following description, an "unlocking state" denotes a state where the locking lever 16, the knob lever 17 and the opening link 18 take their unlocking positions, and a "locking state" denotes a state where the locking lever 16, the knob lever 17 and the opening link 18 take their locking positions. It should be noted that the configuration of the locking and unlocking mechanism is not limited to that of this embodiment, and hence, various modifications can be made thereto.

The electric releasing mechanism includes the releasing motor 22 as the drive source therefor, the releasing worm wheel 23 and the electric releasing lever 24.

The locking and unlocking motor 14 is accommodated in the housing, and a case thereof (a yoke) 14a is situated above the striker entrance line X shown in FIG. 7. The locking and unlocking motor 14 is disposed so that an output shaft 14b that is rotatably supported on the case 14a is directed downwards. Adopting this configuration can prevent rain water that enters from the striker entrance groove 41 from entering the inside of the case 14a of the locking and unlocking motor 14 to a maximum extent.

The wiring plate 25 has a coupler 251 that is formed integrally therewith and to which an outside connector (whose illustration is omitted) of an outside power supply that is connected to an onboard battery (whose illustration is omitted) and the control unit ECU. Additionally, the wiring plate 25 has the wiring that is applied to a side surface thereof that faces the outside of the vehicle. The wiring is used to supply electric power to the inside of the housing and output various signals therefrom. The wiring plate 25 is fixed in place inside the housing so as to cover the case 14a of the locking and unlocking motor 14 from the inside of the vehicle. The wiring of the wiring plate 25 is connected electrically to terminals of the locking and unlocking motor 14 and the releasing motor 22, as well as the outside connector that is connected to the coupler 251 such that the locking and unlocking motor 14 and the releasing motor 22 are controlled by the control unit ECU. It should be noted that the wiring plate 25 is omitted in FIG. 5 for the sake of clarity of an inside structure of the operation unit 3.

As shown in FIG. 8, the locking and unlocking worm wheel 15 is rotatably supported inside the housing by a shaft 26 that is situated below the case 14a of the locking and unlocking motor 14 so as to be directed to the inside and outside of the vehicle. Then, the locking and unlocking worm wheel 15 is brought into meshing engagement with a worm 141 that is securely fastened to the output shaft 14b of the locking and unlocking motor 14 so as to rotate from a neutral position (for example, a position shown in FIG. 8) in a clockwise direction or a counterclockwise direction against a biasing force of a spring 27 (refer to FIG. 6) that is wound around the shaft 26 as the locking and unlocking motor 14 is driven. Then, when the locking and unlocking motor 14 stops rotating, the locking and unlocking worm wheel 15 returns to the neutral position from the position to which it is rotated in the clockwise or counterclockwise direction by virtue of the biasing force of the spring 27.

The knob lever 17 is supported rotatably on a side surface of the second cover 11 by a shaft 111 provided on the second cover 11, and a coupling arm portion 171 that extends downwards is coupled to the manual operation lock knob via a coupling member 28 that is made up of a Bowden cable, whereby the knob lever 17 rotates, for example, to an unlocking position shown in FIG. 8 and a locking position shown in FIG. 9 that is situated a predetermined angle away in a counterclockwise direction from the unlocking position as the lock knob is operated to unlock and lock the door. An operation of the lock knob is transmitted to the locking lever 16 and the opening link 18 by way of the knob lever 17, as will be described later. When the lock knob is omitted, the coupling member 28 is also omitted.

The waterproof side cover 12 is fixed to an outer surface of the second cover 11 after the knob lever 17 is assembled to the second cover 11, whereby the waterproof side cover 12 closes part of the outer surface of the second cover 11 that includes an area where the knob lever 17 is placed to thereby prevent rain water from entering the inside of the housing.

The locking lever 16 is supported rotatably inside the housing by a shaft 101 that is provided on an inner surface of the first cover 10 so as to project towards the inside of the vehicle. In the locking lever 16, a toothed portion 161 that is formed on an obliquely front lower portion meshes with a toothed portion 151 provided on the locking and unlocking worm wheel 15, an upper portion is coupled to the key lever 20, and a coupling projecting portion 162 that is formed on an obliquely front upper portion passes through an arc hole 112 provided in the second cover 11 to be coupled to a coupling hole 172 in the knob lever 17. Further, an arm portion 164 is provided on the locking lever 16, and this arm portion 164 has a guide wall 165 extending downwards from the vicinity of a rotational center. The shaft 101, that is, the rotational center of the locking lever 16 is disposed so as to be situated above the striker entrance line X inside the housing.

By adopting this configuration, when the key lever 20 rotates based on an operation of the key cylinder KC, the knob lever 17 rotates based on an operation of the lock knob and the locking and unlocking worm wheel 15 rotates based on a driving of the locking and unlocking motor 14, the locking lever 16 can rotate to an unlocking position shown in FIG. 8 and a locking position shown in FIG. 9 that is a predetermined angle away in a clockwise direction from the unlocking position and is elastically held in the unlocking position and the locking position by virtue of an elastic holding force of a holding member 29. In the case where the locking and unlocking worm wheel 15 stays in the neutral position, the toothed portion 161 of the locking lever 16 is configured to stay in a non-meshing state relative to the toothed portion 151 of the locking and unlocking worm wheel 15. Due to this, a rotation of the locking lever 16 based on operations of the lock knob and the key cylinder KC is prevented from being transmitted to the locking and unlocking worm wheel 15.

The holding member 29 is made up of a torsion spring. In the holding member 29, a coil portion is supported on a cylindrical support portion 102 (refer to FIG. 6) that is formed integrally on the inner surface of the first cover 10, and both arm portions are placed so as to hold the coupling projecting portion 162 of the locking lever 16 therebetween. By adopting this configuration, when the locking lever 16 rotates from the unlocking position (or the locking position) to the locking position (or the unlocking position), a biasing direction of the locking lever 16 is changed from an unlocking direction (or a locking direction) to a locking direction (or an unlocking direction) substantially at a middle position between the unlocking position and the locking position as a boundary.

Stopping the locking lever 16 in the unlocking position and the locking position is executed as a result of part of the locking lever 16 being brought into abutment with a rubber stopper (whose illustration is omitted) fixed to the inner surface of the first cover 10.

A cam surface 163 is provided on an outer circumferential surface of the upper portion of the locking lever 16, and a detecting portion of a locking and unlocking state detecting switch SW7 that is assembled to the wiring plate 25 comes into contact with the cam surface 163. The locking and unlocking state detecting switch SW7 slides on and contacts relatively the cam surface 163 at the detecting portion as the locking lever 16 rotates and outputs a signal corresponding to an unlocking state or a locking state of the locking and unlocking mechanism. The signal so outputted is sent to the control unit ECU by way of the wiring plate 25.

The opening link 18 has a coupling hole 182 having an hourglass shape in a rotating portion 181 at a lower portion thereof. A plate-shaped coupling portion 211 that is provided at an inboard end portion of the outside lever 21 is inserted into the coupling hole 182, whereby the opening link 18 is coupled to the coupling portion 211 of the outside lever 21 so as to rotate a predetermined angle in the front and rear direction. Then, a coupling portion 183 provided at an upper portion is coupled to the arm portion 164 of the locking lever 16, as will be described later, whereby the opening link 18 rotates about the coupling portion 211 of the outside 21 to an unlocking position (a position shown in FIG. 8) and a locking position (a position shown in FIG. 9) that is situated a predetermined angle away in a counterclockwise direction from the unlocking position as the locking lever 16 rotates to the unlocking position and the locking position.

Further, a releasing portion 184 is provided at a substantially central portion of the opening link 18 in the up and down or vertical direction, and when the opening link 18 stays in the unlocking position shown in FIG. 8, the releasing portion 184 can be brought into abutment with the released portion 71 of the opening lever 17 from therebelow. Additionally, a torsion spring 36 is placed on the rotating portion 181 of the opening link 18.

The torsion spring 36 is hooked on the opening link 18 at one end and the coupling portion 211 of the outside lever 21 at the other end thereof to thereby apply a biasing force to the opening link 18 in the unlocking direction (a clockwise direction in FIG. 8) about the coupling portion 211 of the outside lever at all times. The biasing force of the torsion spring 36 is set to be smaller than the holding force of the holding member 29 with which the locking lever 16 is elastically held in the locking position.

The coupling projecting portion 183 of the opening link 18 can slide in the vertical direction relative to the arm portion 164 of the locking lever 16 and is coupled to the arm portion 164 of the locking lever 16 in such a form that the coupling projecting portion 183 can be brought into abutment with the guide wall 165 only when the locking lever 16 rotates in the locking direction (a counterclockwise direction in FIG. 8).

By adopting this configuration, in the unlocking state shown in FIG. 8, when the locking lever 16 rotates to the locking position, the guide wall 165 of the locking lever 16 is brought into abutment with the coupling projecting portion 183 of the opening link 18, whereby the locking lever 16 rotates from the unlocking position to the locking position shown in FIG. 9. In addition, in the locking state shown in FIG. 9, when the locking lever 16 rotates to the unlocking position, the opening link 18 follows the rotation of the locking lever 16 to rotate from the locking position to the unlocking position shown in FIG. 8 by virtue of the biasing force of the torsion spring 36 without depending on the abutting relationship between the guide wall 165 and the coupling projecting portion 183.

In the locking state shown in FIG. 9, the biasing force of the torsion spring 36 is applied to the locking lever 16 in the unlocking direction (the clockwise direction). However, since the biasing force of the torsion spring 36 is smaller than the elastic folding force of the holding member 29 with which the locking lever 16 is held in the locking position, the locking lever 16 and the opening link 18 are prevented from being rotated to the unlocking positions by virtue of the biasing force of the torsion spring 36.

The outside lever 21 is supported rotatably so as to rotate in the vertical direction at a lower portion of a front surface of the body 4 by a shaft 31 that is directed to face the front and rear direction. Then, the coupling portion 211 at the inboard end portion of the outside lever 21 is coupled to the opening link 18 as described above, and a coupling portion 212 provided at an outboard end portion of the outside lever 21 is coupled to the outside lever OH via a vertical coupling member (whose illustration is omitted), whereby the outside lever 21 rotates a predetermined angle in a releasing direction (a counterclockwise direction in FIG. 6) against a biasing force of a spring (whose illustration is omitted) as the outside handle OH is operated to open the door. Then, this rotation of the outside lever 21 causes the opening link 18 to move upwards to perform a releasing operation.

The releasing motor 22 is disposed so that a case (a yoke) 22a thereof is situated below the striker entrance line X inside the housing and that an output shaft 22b that is rotatably supported on the case 22a is directed obliquely downwards to the rear.

Disposing the releasing motor 22 below the striker entrance line X would cause fears that rain water entering from the striker entrance groove 41 may adhere to the releasing motor 22. However, since the releasing motor 22 is disposed so that the output shaft 22b is directed obliquely downwards to the rear, the entrance of rain water into the case 22a can be suppressed to a minimum level.

The releasing worm wheel 23 has a circular disc shape and is supported rotatably on a shaft 39 that is directed to face the inside and outside of the vehicle inside the housing. The releasing worm wheel 23 meshes with a worm 221 that is securely fastened to the output shaft 22b that is supported rotatably on the case 22a of the releasing motor 22 and rotates a predetermined angle in a clockwise direction from a set portion (for example, a position shown in FIG. 8) against a biasing force of a spring 35 (refer to FIG. 6) that is wound around the shaft 39 as the releasing motor 22 is driven. Then, when the releasing motor 22 stops rotating after the releasing worm wheel 23 rotates to a position shown in FIG. 10, the releasing worm wheel 23 is caused to return to the set position from the position to which the releasing worm wheel 23 has rotated by the biasing force of the spring 35. Additionally, a cam surface 231 is provided on the releasing worm wheel 23, and this cam surface 231 has the shape of an involute curve in which a distance from a rotational center to an outer circumferential surface of the cam increases gradually in the counterclockwise direction in FIG. 8.

The electric releasing lever 24 is supported rotatably by a shaft 103 at a central portion thereof in the front and rear direction inside the housing. The electric releasing lever 24 has a first arm portion 241 extending to the front and capable of sliding on and contacting the cam surface 231 of the releasing worm wheel 23 at a distal end portion and a second arm portion 242 extending to the rear and capable of being brought into abutment with the released portion 71 of the opening lever 7 from therebelow at a distal end portion.

For example, as shown in FIG. 8, when the releasing worm wheel 23 stays in the set position, the distal end portion of the first arm portion 241 of the electric releasing lever 24 is in abutment with a small diameter portion of the cam surface 231 of the releasing worm wheel 23, whereby the electric releasing lever 24 is held in the set position shown in FIG. 8. In this state, when the releasing worm wheel 23 rotates a predetermined angle from the set position shown in FIG. 8 in the clockwise direction to arrive at a releasing position shown in FIG. 10 based on a driving of the releasing motor 22, the distal end portion of the first arm portion 241 of the electric releasing lever 24 slides relatively on the cam surface 231 to be displaced to a large diameter portion of the cam surface 231, while the distal end portion of the second arm portion 242 is brought into abutment with the released portion 71 of the opening lever 7 from therebelow, causing the opening lever 7 to perform a releasing operation to release an engagement relationship between the latch 5 and the ratchet 6, thereby making it possible to open the front side door FD.

The inside lever 19 is supported rotatably by the shaft 103 that is concentric with the electric releasing lever 24 at a portion situated slightly below a central portion thereof in the vertical direction inside the housing and has a first arm portion 191, a second arm portion 192 and an unlocking operating portion 193. The first arm portion 191 extends upwards to project to the outside from an arc-shaped opening 113 (refer to FIG. 5) that is provided in the second cover 11. The second arm portion 192 extends obliquely downwards to the rear. The unlocking operating portion 193 is formed at an upper end portion of the first arm portion 191 and can be brought into abutment with one portion 173 of a lower part of the coupling arm portion 171 of the knob lever 17. An upper portion of the first arm portion 191 is coupled to the inside handle IH of the front side door FD by way of a coupling member 33 made up of a Bowden cable or the like, whereby as the inside handle IH is operated to open the door, the inside lever 19 rotates a predetermined angle in the counterclockwise direction from a set position shown in FIG. 8 against a biasing force of a spring 34 that is wound around the shaft 103 to thereby perform a releasing operation.

An abutment portion 192a is formed at a distal end portion of the second arm portion 192, and this abutment portion 192a can be brought into abutment with the rotating portion 181 of the opening link 18 from therebelow when the inside lever 19 performs the releasing operation.

The coupling member 33 is coupled to an upper portion of the first arm portion 191 of the inside lever 19 in such a way as to pass between the case 14a of the locking and unlocking motor 14 that is disposed at an upper portion inside the housing and the case 22a of the releasing motor 22 that is disposed at a lower portion inside the housing. This avoids a risk of the coupling member 33 overlapping the cases 14a, 22a that are thick in an inside and outside direction of the vehicle in relation to the same direction, thereby making it possible to reduce a thickness of the housing in relation to an inside direction of the vehicle.

Next, referring to FIGS. 14 to 16, the door lock apparatus 1R for the rear side door RD will be described.

The door lock apparatus 1R includes a meshing unit 2, whose illustration is omitted, having the same structure as that of the meshing unit 2 of the door lock apparatus 1F and an operation unit 3 whose configuration differs partially from the operation unit 3 of the door lock apparatus 1F. Consequently, the door lock apparatus 1R will be described only in relation to different features from the door lock apparatus 1F.

The door lock apparatus 1R has a first inside lever 19A and a second inside lever 19B in place of the inside lever 19 of the door lock apparatus 1F, and a child proof operation lever 19C and a connecting link 19D that constitute a child proof mechanism.

The first and second inside levers 19A, 19B are both supported rotatably on a shaft 103 that is concentric with an electric releasing lever 24.

The first inside lever 19A is coupled to the inside handle IH of the rear side door RD by way of a coupling member 33 at an upper end portion of a first arm portion 191A that extends upwards and performs a releasing operation in a counterclockwise direction from a set position shown in FIG. 15 as the inside handle IH is operated to open the door. Additionally, a control hole 195 having substantially an L shape when seen from a side thereof is provided in the first inside lever 19A.

The second inside lever 19B has a vertical elongated hole 196 that partially overlaps the control hole 195 in the first inside lever 19A and an abutment portion 192aB.

The child proof operation lever 19C is supported rotatably by a shaft 104 inside a housing and can rotate to a child proof unlocking position shown in FIG. 13 and a child proof locking position shown in FIG. 16 that is situated a predetermined angle in a counterclockwise direction away from the child proof unlocking position. An arc hole 197 directed to face the front and rear direction is provided at a front portion of the child proof operation lever 19C and an operation portion 198 projecting to the outside from a rear end face of the rear side door RD is provided at a rear portion of the child proof operation lever 19C.

In the connecting link 19D, an elongated hole 19Da provided in a vertically central portion engages with the shaft 103 so as to slide vertically, a lower projecting portion 19Db provided at a lower portion engages with the arc hole 197 in the child proof operation lever 19C so as to slide therein, and an upper projecting portion 19Dc provided at an upper portion engages with the control hole 195 and the elongated hole 196 so as to slide therein. In this configuration, when the child proof operation lever 19C stays in the child proof unlocking position shown in FIG. 14, the upper projecting portion 19Dc is in engagement with a narrow upper portion of the control hole 195, whereby the connecting link 19D is allowed to transmit the releasing operation of the first inside lever 19A to the second inside lever 19B. On the contrary, when the child proof operation lever 19C stays in the child proof locking position shown in FIG. 15, the upper projecting portion 19Dc stays in a wide lower portion of the control hole 195, whereby the connecting link 19D is prevented from transmitting the releasing operation of the first inside lever 19A to the second inside lever 19B.

Next, an electrical circuit including the control unit ECU according to this embodiment will be described.

As shown in FIG. 17, the control unit ECU is configured as an integral one-chip CPU together with a ROM that stores control programs and a RAM that functions as a working area for the CPU and executes a series of control processes using the control programs stored in the ROM. Additionally, the control unit ECU includes an authenticating module for collating an ID signal for a radio communication performed between the transmitter SW6 and the receivers R1, R2. The authenticating module may be separated from the control unit ECU.

The receivers R1, R2, the outside operation switches SW1, SW3 and the inside operation switches SW2, SW4 of the individual doors, the canceling switch SW5, the locking and unlocking state detecting switches SW7, child proof locking state detecting switches SW8 for detecting states of the child proof mechanisms, a vehicle speed sensor SW9 for detecting a vehicle speed, and the inside locking and unlocking operation switch SW11 are each electrically connected to an input port of the control unit ECU so that signals from the switches are inputted into the control unit ECU. Additionally, the locking and unlocking motors 14 and the releasing motors 22, as well as notification means (an alarming device) AL are electrically connected to an output port of the control unit ECU.

The cancellation switch SW5 is used when switching between an unsetting state where the operations of the inside operation switches SW2, SW4 that are provided in the other side doors than the front side door FD of the driver's seat are made enabled and a canceling state where the operations of the same inside operation switches SW2, SW4 are made disabled. Receiving an unsetting signal from the cancellation switch SW5, the control unit ECU holds the cancellation switch SW5 in the unsetting state where the operations of the inside operation switches SW2, SW4 are made enabled, whereas receiving a cancellation signal from the cancellation switch SW5, the control unit ECU holds the cancellation switch SW5 in the canceling state where the operations of the inside operation switches SW2, SW4 are made disabled.

The locking and unlocking state detecting switch SW7 detects a state of the locking and unlocking mechanism. Then, the locking and unlocking state detecting switch SW7 outputs an unlocking signal to the control unit ECU when detecting an unlocking state whereas the locking and unlocking state detecting switch SW7 outputs a locking signal to the control unit ECU when detecting a locking state.

The child proof locking state detecting switch SW8 detects a state of the child proof mechanism. The child proof locking state detecting switch SW8 sends a child proof unlocking signal to the control unit ECU when detecting a child proof unlocking state whereas the child proof locking state detecting switch SW8 sends a child proof locking signal to the control unit ECU when detecting a child proof locking state.

The vehicle speed sensor SW9 is used to detect whether the motor vehicle is at a halt or is running. The vehicle speed sensor SW9 sends a halt signal to the control unit ECU when detecting a halt or a speed equal to or slower than a predetermined speed set in advance and sends a running signal to the control unit ECU when detecting a speed faster than the predetermined speed.

The inside locking and unlocking operation switch SW11 is provided inside the vehicle and sends an unlocking signal to the control unit ECU when an unlocking operation is performed while sending a locking signal to the control unit ECU when a locking operation is performed. When receiving the unlocking signal, the control unit ECU controls to drive the locking and unlocking motor 14 to perform an unlocking operation to switch the locking and unlocking mechanism to the unlocking state, whereas when receiving the locking signal, the control unit ECU controls to drive the locking and unlocking motor 14 to perform a locking operation to switch the locking and unlocking mechanism to the locking state. Electric power is supplied to the locking and unlocking motors 14 from a battery power supply PS1 mounted in the motor vehicle.

When receiving signals from the transmitter SW6, the canceling switch SW5, the locking and unlocking detecting switches SW7, the child proof locking state detecting switches SW8 and the vehicle speed sensor SW9, the control unit ECU performs switching controls to enable or disable respective door opening operations of the operation switches SW1 to SW4 and the portable operation switch SW10 according to situations represented by the signals inputted thereinto. Then, when receiving enable door opening signals from the operation switches SW1 to SW4 and the portable operation switch SW10, the control unit ECU controls to drive the releasing motors 22 of the doors that are operated to be opened. Electric power is supplied to the releasing motors 22 from the battery power supply PS1.

The notification means AL includes hazard warning lamps or direction indicator lamps, a buzzer and the like and informs that the locking and unlocking mechanisms are switched to the locking state through at least one of an visible means (for example, by flashing the lamps) and an audible means (for example, through a sound of the buzzer) based on an operation control by the control unit ECU.

FIG. 18 is a plan view showing authenticating areas of the transmitter SW6 carried outside the vehicle, and FIG. 19 is a plan view showing authenticating areas of the transmitter SW6 carried or left inside the vehicle.

The outside receivers R1 are disposed so as to receive a signal from the transmitter SW6 when the transmitter SW6 exists in predetermined areas outside the vehicle. In the example shown in FIG. 18, the outside receivers R1 are disposed individually on front side doors FD on a driver's seat side and a front passenger's seat side. Then, an area OA1 situated adjacent to the front side door FD on the driver's seat side and an area OA2 situated adjacent to the front side door FD on the front passenger's seat side are set as areas where a signal from the transmitter SW6 carried outside the vehicle can be received by the outside receivers R1. In the case where the transmitter SW6 is carried or disposed inside either the area OA1 or the area OA2 and an ID signal sent and received is collated to be found identical with a proper ID signal set in advance through a radio communication performed between the outside receiver R1 corresponding to the relevant area and the transmitter SW6, the control unit ECU authenticates the transmitter SW6 and verifies that a proper user has approached the motor vehicle V.

Setting of the areas where the signal from the transmitter SW6 carried outside the vehicle can be received by the outside receivers R1 is not limited the example shown in FIG. 18. For example, only the area OA1 that is situated adjacent to the front side door FD on the driver's seat side may be set as the area where the signal from the transmitter SW6 carried outside the vehicle can be received.

Similarly, the inside receivers R2 are also disposed inside the vehicle so as to receive the signal from the transmitter SW6 carried or left in predetermined areas inside the vehicle. In the example shown in FIG. 19, the inside receivers R2 are disposed to be scattered in a passenger compartment and a luggage compartment, and one area IA expanding to the passenger compartment and the luggage compartment is set as an area where the signal from the transmitter SW6 can be received. In the case where the transmitter SW6 is disposed inside the area IA and the signal from the transmitter SW6 is collated to be found identical with the proper ID signal set in advance through a radio communication performed between the inside receivers R2 and the transmitter SW6, the control unit ECU authenticates the transmitter SW6.

The control unit ECU performs switching controls for the front side door FD and the rear side door RD as illustrated in FIGS. 20 and 21, respectively.

In rows of "transmitter SW6" illustrated in FIGS. 20, 21, "Authenticated (Outside Vehicle)" denotes a case where the user who carries the transmitter SW6 stays in the predetermined area outside the vehicle and the transmitter SW6 is authenticated as a result of a collation of the ID signal performed between the outside receiver R1 and the transmitter SW6 finding that the ID signal is identical with the proper ID signal set in advance. On the other hand, "Not Authenticated" denotes a case where the transmitter SW6 is not authenticated as a result of the transmitter SW6 staying out of the predetermined areas set outside the vehicle and inside the vehicle. In addition, "authenticated (Inside Vehicle)" denotes a case where the transmitter SW6 is carried or left inside the vehicle, that is, the user is sitting inside the vehicle and the transmitter SW6 is authenticated as a result of a collation of the ID signal performed between the inside receivers R2 and the transmitter SW6 finding that the ID signal is identical with the proper ID signal set in advance.

Then, referring to FIGS. 20 and 21, the control unit ECU will execute, for example, the following switching controls.

<Front Side Doors FD>

As can be understood from FIG. 20, in a state where the transmitter SW6 is "Authenticated (Outside Vehicle)," operations of the outside operation switches SW1 on the driver's seat side front side door and the front passenger's seat side front side door and the portable operation switch SW10 are enabled irrespective of an operation of the canceling switch SW5 and what the locking and unlocking state detecting switches SW7 detect, provided that the vehicle speed sensor SW9 detects a halt of the motor vehicle V.

In the case where a canceling state is held as a result of the canceling switch SW5 performing a canceling operation, an operation of the inside operation switch SW2 of the front passenger's seat side front side door is disabled even though the vehicle speed sensor SW9 outputs a halt signal.

In a state where the transmitter SW6 is "Not Authenticated," in the case where an unsetting state is held as a result of the canceling switch SW5 being operated, operations of the inside operations switches SW2 in the driver's seat side and front passenger's seat side front side doors are made enabled, provided that the vehicle speed sensor SW9 outputs a halt signal. All the other operations than these operations are made disabled. By adopting this configuration, even in the case where the proper user does not sit in the motor vehicle V, the front seat passenger can open the corresponding front side door FD quickly by operating the inside operation switch SW2, thereby making it possible to prevent the front seat passenger from being left confined inside the vehicle. From the security point of view, operations of all the inside operation switches SW2 including operations of the inside operation switches SW2 in the driver's seat and front passenger's seat side front side doors may be made disabled, provided that the unsetting state is held as a result of the canceling switch SW5 being operated.

In a state where the transmitter SW6 is "Authenticated (Inside Vehicle)," operations of the outside operation switches SW1 of the driver's seat and front passenger's seat side front doors are enabled, provided that the locking and unlocking state detecting switches SW7 detect an unlocking state, whereas the operations are disabled, provided that the locking and unlocking state detecting switches SW7 detect a locking state. By adopting this configuration, when the user remains inside the vehicle, there is caused no fear of the front side door being opened abruptly by an unknown person from the outside of the vehicle.

<Rear Side Doors RD>

As can be understood from FIG. 21, in a state where the transmitter SW6 is "Authenticated (Outside Vehicle)," operations of the outside operation switches SW3 and the portable operation switch SW10 are enabled irrespective of an operation of the canceling switch SW5 and what the locking and unlocking state detecting switches SW7 and the child proof locking state detecting switches SW8 detect, provided that the vehicle speed sensor SW9 outputs a halt signal.

Operations of the inside operation switches SW4 are disabled irrespective of what the locking and unlocking state detecting switches SW7 and the vehicle speed sensor SW9 detect, in the case where the child proof locking state detecting switches SW8 detect a child proof locking state. This can prevent an erroneous operation of the inside operation switches SW4 by a child or the like.

In a state where the transmitter SW6 is "Not Authenticated," in the case where an unsetting state is held as a result of the canceling switch SW5 being operated, operations of the inside operation switches SW4 are enabled only when the vehicle speed sensor SW9 outputs a halt signal. All the other operations than this operation are disabled. By adopting this configuration, even in the case where the proper user does not sit in the motor vehicle V, a rear seat passenger can open the corresponding rear side door RD quickly by operating the inside operation switch SW4, thereby making it possible to prevent the rear seat passenger from being left confined inside the vehicle. From the security point of view, operations of all the inside operation switches including operations of the inside operation switches SW4 may be disabled, in the case where the unsetting state is held as a result of the canceling switch SW5 being operated.

In a state where the transmitter SW6 is "Authenticated (Inside Vehicle)," operations of the outside operation switches SW3 are enabled, in the case where the locking and unlocking state detecting switches SW7 detect an unlocking state, whereas the operations are disabled, in the case where the locking and unlocking state detecting switches SW7 detect a locking state. By adopting this configuration, when the user remains inside the vehicle, there is caused no fear of the rear side door being opened abruptly by an unknown person from the outside of the vehicle.

Next, main operations of the door lock apparatuses 1F, 1R will be described.

Cases that will be described below are premised that the doors are closed, the control unit ECU authenticates the ID signal of the transmitter SW6, the vehicle speed sensor SW9 outputs a halt signal, an unsetting state is held as a result of the canceling switch SW5 being operated, and all operations of the operation switches SW1 to SW4 are enabled.

In the case where operations of the front side door FD are common to the rear side door RD, the operations of the front side door FD will be described as representing those of the rear side door RD.

<Case where Outside Handle OH is Operated to Open the Door with Locking and Unlocking Mechanism Staying in Unlocking State (for Front Side Door FD and Rear Side Door RD)>

With the locking and unlocking mechanism shown in FIG. 8 staying in the unlocking state, when the outside handle OH is operated to open the door, the door opening operation is transmitted to the outside lever 21 by way of a coupling member, not shown, whereby the outside lever 21 performs a releasing operation. The opening link 18 that is coupled to the coupling portion 211 of the outside lever 21 moves upwards from the set position shown in FIG. 8 to perform a releasing operation. This releasing operation brings the unlocking portion 184 into abutment with the released portion 71 of the opening lever 7 from therebelow, causing the opening lever 7 to perform a releasing operation. This disengages the ratchet 6 from the full latch engaging portion 51 of the latch 5 whereby the front side door FD can be opened. This allows the individual doors to be opened by operating mechanically the outside handles OH to open the doors with the locking and unlocking mechanisms staying in the unlocking state whether the operations of the outside operations switches SW1, SW3 are enabled or disabled.

<Case where Inside Handle IH is Operated with Locking and Unlocking Mechanism Staying in Unlocking State (for Front Side Door FD and Rear Side Door RD)>

With the locking and unlocking mechanism shown in FIG. 8 staying in the unlocking state, when the inside handle IH is operated to open the door, the door opening operation is transmitted to the inside lever 19 by way of the coupling member 33. The inside lever 19 performs a releasing operation to rotate a predetermined angle in the counterclockwise direction about the shaft 103 that is concentric with the electric releasing lever 24, whereby as shown in FIG. 12, the abutment portion 192a of the second arm portion 192 comes into abutment with the rotating portion 181 of the opening link 18 from therebelow to shift the opening link 18 upwards for releasing operation. As a result of the opening link 18 performing the releasing operation, the releasing portion 184 comes into abutment with the released portion 71 of the opening lever 7 from therebelow to thereby rotate the opening lever 7 in a releasing direction, whereby the meshing engagement of the meshing mechanism is released, thereby allowing the front side door FD to be opened.

<Case where Outside Handle OH is Operated with Locking and Unlocking Mechanism Staying in Locking State (for Front Side Door FD and Rear Side Door RD)>

In the locking state shown in FIG. 9, when the outside handle OH is operated to open the door, this door opening operation is transmitted to the outside lever 21, whereby the opening link 18 moves upwards from the set position shown in FIG. 9 to perform a releasing operation. However, the releasing portion 184 of the opening link 18 moves idly across in front of the released portion 71 of the opening lever 7 without being brought into abutment with the released portion 71. Due to this, the opening link 18 cannot cause the opening lever 7 to perform a releasing operation, whereby the front side door FD cannot be opened.

<Case where Inside Handle IH is Operated with Locking and Unlocking Mechanism Staying in Locking State (for Front Side Door)>

In the locking state shown in FIG. 9, when the inside handle IH is operated to open the door, the inside lever 19 performs a releasing operation (rotates in the counterclockwise direction in FIG. 9) from the set position shown in FIG. 9 against the biasing force of the spring 34, whereby as shown in FIG. 13, the unlocking operating portion 193 of the inside lever 19 comes into abutment with the one portion 173 of the knob lever 17, whereby the locking lever 16 and the opening link 18 are shifted from the locking positions to the unlocking positions thereof.

As this occurs, the opening link 18 rotates in the unlocking direction together with the locking lever 16 while moving idly across in front of the released portion 71 of the opening lever 7 as the inside lever 19 performs the releasing operation. Thus, as shown in FIG. 13, since part of the opening link 18 comes into abutment with part of the opening lever 7 from a direction in which the opening link 18 cannot rotate the opening lever 7, the opening link 18 once stops before the unlocking position. Then, when the inside handle IH is once returned to an inoperable position, the opening link 18 moves downwards, and the part of the opening link 18 is disengaged from the part of the opening lever 7, whereby the opening link 18 is caused to move to the unlocking position by virtue of the biasing force of the torsion spring 36 and then arrives at the unlocking position. This switches the locking and unlocking mechanism to the unlocking state completely. Thereafter, when the inside handle IH is operated again to open the door, the meshing of the meshing mechanism can be released, thereby making it possible to open the front side door FD.

<Case where Locking and Unlocking Mechanism Stays in Unlocking State and Child Proof Mechanism Stays in Child Proof Unlocking State (for Rear Side Door RD)>

When referred to herein, the "child proof unlocking state" denotes a state where the child proof operation lever 19C stays in the child proof unlocking position, whereby an operation of the first inside lever 19A can be transmitted to the second inside lever 19B. The "child proof locking state" denotes a state where the child proof operation lever 19C stays in the child proof locking position, whereby an operation of the first inside lever 19A cannot be transmitted to the second inside lever 19B.

In the state shown in FIG. 15, when the inside handle IH is operated to open the door, the first inside lever 19A rotates about the shaft 103 the predetermined angle in the counterclockwise direction from the set portion. The rotation of the first inside lever 19A is transmitted to the second inside lever 19B by way of the connecting link 19D, whereby the second inside lever 19B rotates in the counterclockwise direction together with the first inside lever 19A to perform a releasing operation. This brings the abutment portion 192aB of the second inside lever 19B into abutment with the lower portion of the rotating portion 181 of the opening link 18 from therebelow to thereby move the opening link 18 upwards to perform a releasing operation. As a result of the opening link 18 performing the releasing operation, the releasing portion 184 is brought into abutment with the released portion 71 of the opening lever 7 from therebelow, whereby the opening lever 7 is caused to rotate in a releasing direction to release the meshing of the meshing mechanism, thereby making it possible to open the rear side door RD.

<Case where Locking and Unlocking Mechanism Stays in Unlocking State and Child Proof Mechanism Stays in Child Proof Unlocking State (for Rear Side Door RD)>

In FIG. 16, even though the first inside lever 19A performs a releasing operation based on a door opening operation of the inside handle IH, since the releasing operation is not transmitted to the second inside lever 19B, the rear side door RD cannot be opened. Consequently, in this state, although the rear side door RD can be opened by operating the outside handle OH to open the door from the outside of the vehicle, the rear side door RD cannot be opened by operating the inside handle IH to open the door from the inside of the vehicle.

<Case where Opening Switching Module of Outside Operation Switch SW1, SW3 or Portable Operation Switch SW10 with Locking and Unlocking Mechanism Staying in Unlocking State or Locking State (for Front Side Door FD and Rear Side Door RD)>

When receiving a door opening signal from any one of the outside operation switches SW1, SW3 and the portable operation switch SW10, the control unit ECU controls to drive the releasing motor 22 of the door to be operated to open (the door whose outside operation switch SW1, SW1 is operated or the door selected by the portable operation switch SW10) to activate a releasing operation so as to rotate the corresponding releasing worm wheel 23 in the releasing direction (the clockwise direction in FIG. 8) from the set position. As the control unit ECU controls the releasing motor 22 as described above, in the electric releasing lever 24, the distal end portion of the first arm portion 241 slides on the cam surface 231 of the releasing worm wheel 23 and rotates from the set position to the releasing operating position (the position shown in FIG. 10 when in the unlocking state, the position shown in FIG. 11 when in the locking state) and the distal end portion of the second arm portion 242 is brought into abutment with the released portion 71 of the opening lever 7 from therebelow as the releasing worm wheel 23 rotates in the releasing direction irrespective of the state of the locking and unlocking mechanism, whereby the electric releasing lever 24 causes the opening lever 7 to perform the releasing operation. This releases the meshing mechanism from the engaged state, whereby the door to be operated to open can be opened.

In this operation, since the electric releasing lever 24 causes directly the opening lever 7 to perform the releasing operation irrespective of the state of the locking and unlocking mechanism (including the child proof mechanism in the case of the rear side door RD), even though the locking and unlocking mechanism stays in the locking state, the door to be operated to open can be opened quickly by driving the releasing motor 22 to activate a releasing operation through a single door opening operation of the outside operation switch SW1, SW3 or the portable operation switch SW10.

<Case where Inside Operation Switch SW2 or SW4 is Operated with Locking and Unlocking Mechanism Staying in Either of Unlocking State or Locking State (for Front Side Door FD and Rear Side Door RD)>

When receiving a door opening signal from the inside operation switch SW2 or SW4, the control unit ECU controls to drive the releasing motor 22 of the door to be operated to open to activate a releasing operation. This causes the electric releasing lever 24 to perform a releasing operation irrespective of the state of the locking and unlocking mechanism (including the child proof mechanism in the case of the rear side door RD), whereby the door to be operated to open can be opened through a single door opening operation of the inside operation switch SW2 or SW4.

<Case where Door Opening Operation of Outside Operation Switch SW1, SW3 or Portable Operation Switch SW10 and Unlocking Operation of Inside Locking and Unlocking Switch SW11 are Performed Substantially at the Same Time (for Front Side Door FD and Rear Side Door RD)>

When receiving a door opening signal from any one of the outside operation switch SW1, SW3 and the portable operation switch SW10, the control unit ECU controls to drive the releasing motor 22 of the door to be operated to open to activate a releasing operation. When receiving an unlocking operating signal from the inside locking and unlocking operation switch SW11, the control unit ECU controls to drive the locking and unlocking motor 14 to activate an unlocking operation.

Driving the releasing motor 22 and the locking and unlocking motor 14 in the way described above then activates the electric releasing lever 24 to perform a releasing operation from the set position shown in FIG. 9. On the other hand, the locking and unlocking mechanism is switched from the locking state shown in FIG. 9 to the unlocking state as a result of the locking and unlocking motor 14 being driven substantially at the same time as the electric releasing lever 24 performs the releasing operation. As a result of this, as shown in FIG. 10, the electric releasing lever 24 causes directly the opening lever 7 to perform the releasing operation, and the locking and unlocking mechanism is not brought into abutment with the opening lever 7 and is switched from the locking state to the unlocking state. As this occurs, even though the releasing operation of the electric releasing lever 24 and the switching operation of the locking and unlocking mechanism from the locking state to the unlocking state overlap each other, part of the opening link 18 of the locking and unlocking mechanism is brought into abutment with the opening lever 7 from the direction in which the opening lever 7 cannot rotate, and a so-called panic phenomenon in which the opening link 18 stops once before the unlocking position does not occur, whereby the door can be opened quickly through a single door opening operation of the outside operation switch SW1, SW3 or the portable operation switch SW10, and the locking and unlocking mechanism can be switched to the unlocking state in an ensured fashion.

The operations of the door lock apparatuses 1F, 1R that are performed to open the door have been described heretofore. Next, operations of the door lock apparatuses 1F, 1R will be described which are performed when the user who carries the transmitter SW6 leaves his or her motor vehicle with the doors of the motor vehicle closed.

The description is premised that the user who carries the transmitter SW6 remains in the predetermined area (for example, the area OA1 shown in FIG. 18) outside the vehicle immediately after the user closes the doors and that the transmitter SW6 is authenticated.

The transmitter SW6 moves from the inside to the outside of the predetermined area defined outside the vehicle as the user who carries the transmitter SW6 moves away from his or her motor vehicle. This causes the control unit ECU to switch the transmitter SW6 from the authenticated state to the non-authenticated state. Then, when the transmitter SW6 is switched to the non-authenticated state, the control unit ECU controls to drive the locking and unlocking motors 14 to activate a locking operation so as to switch the locking and unlocking mechanisms of all the side doors to the locking state without involving any operation of the user. This operation can prevent the user from leaving his or her motor vehicle with the doors left unlocked, thereby making it possible to enhance the convenience in getting out of the motor vehicle.

It is also possible to switch the locking and unlocking mechanisms to the locking state when the user who carries the transmitter SW6 leaves his or her motor vehicle by operating the locking switching module of the portable operation switch SW10 while the transmitter SW6 is remaining within the predetermined area outside the motor vehicle. Additionally, it is also possible to switch the locking and unlocking mechanisms to the locking state by operating the key cylinders KC as the outside mechanical operation elements. Further, the side doors may be closed by operating the individual lock knobs as the inside mechanical operation elements of the individual side doors that are linked with the knob levers 17 or operating the inside locking and unlocking operation switch SW11 to thereby switch the locking and unlocking mechanisms to the locking state.

Then, when controlling to drive the locking and unlocking mechanisms to activate the locking operation as a result of the transmitter SW6 being switched to the non-authenticated state, the control unit ECU also activates the notification means AL (refer to FIG. 17) to inform the user that the locking and unlocking mechanisms are switched to the locking state visually (for example, by flashing the lamps) and audibly (for example, by emitting the buzzing sound from the buzzer). In the event that the locking and unlocking mechanisms are not properly driven to activate the locking operation due to, for example, a shortage of electric power supplied from the battery power supply PS1 to the locking and unlocking motors 14 for the reason of a failure of the battery power supply PS1, the user can be informed that the locking and unlocking motors 14 are not properly driven to activate the locking operation by the fact that the alarming operation is not performed. Then, the user can be urged to switch the locking and unlocking mechanisms to the locking state by operating the portable operation switch SW10, the key cylinders KC, the lock knobs or the inside locking and unlocking operation switch SW11, whereby the user can be more reliably prevented from leaving the motor vehicle with the side doors left unlocked. The notification means AL may also be activated when the locking and unlocking mechanisms are switched to the locking state by operating the portable operation switch SW10, the key cylinders KC, the lock knobs or the inside locking and unlocking operation switch SW11.

Preferably, the notification means AL is also activated when the meshing mechanisms are released from the meshed state as a result of the control unit ECU controlling to drive the releasing motors 22 to activate the releasing operation, and the operation mode of the notification means AL when the locking and unlocking mechanisms are switched to the locking state as a result of the transmitter SW6 being switched to the non-authenticated state and the operation mode of the notification means AL when the meshing mechanisms are released from the meshed state are made to differ from each other. By making specific the operation mode of the notification means AL when the locking and unlocking mechanisms are switched to the locking state as a result of the transmitter SW6 being switched to the non-authenticated state, the user is allowed to recognize whether or not the locking and unlocking mechanisms are switched to the locking state in a more ensured fashion when the user leaves the motor vehicle after he or she closes the side doors thereof. The number of times of emitting the buzzing sound from the buzzer or intervals at which the bussing sound is emitted from the buzzer and the number of times of flashing the lamps or intervals at which the lamps are flashed can be raised as examples of operation modes of the notification means AL.

Additionally, preferably, the notification means AL is also activated when the locking and unlocking mechanisms are switched to the unlocking state as a result of the control unit ECU controlling to drive the locking and unlocking motors 14 to activate the unlocking operation based on the operation of the unlocking switching module of the portable operation switch SW10, and the operation mode of the notification means AL when the locking and unlocking mechanisms are switched to the locking state as a result of the transmitter SW6 being switched to the non-authenticated state and the operation mode of the notification means AL when locking and unlocking mechanisms are switched to the unlocking state are made to differ from each other. By making specific the operation mode of the notification means AL when the locking and unlocking mechanisms are switched to the locking state as a result of the transmitter SW6 being switched to the non-authenticated state, the user is allowed to recognize whether or not the locking and unlocking mechanisms are switched to the locking state in a more ensured fashion when the user leaves the motor vehicle after he or she closes the side doors thereof.

FIG. 22 shows a modified example of an electric circuit including the control unit ECU.

In the example shown in FIG. 22, an auxiliary power supply PS2 is provided in addition to the battery power supply PS1 as a power supply for supplying electric power to the locking and unlocking motors 14 and the releasing motors 22.

In the case where there is a shortage of electric power supplied from the battery power supply PS1 to the locking and unlocking motors 14, the control unit ECU switches the source of electric power to be supplied from the batter power supply PS1 to the auxiliary power supply PS2 to drive the locking and unlocking motors 14 to activate the locking operation. Thus, for example, even in the event that the battery power supply PS1 fails, the locking and unlocking motors 14 can be driven to activate the locking operation, thereby making it possible to prevent the user from leaving the motor vehicle with the side doors left unlocked.

Similarly, as to the releasing motors 22 that receives the supply of electric power from the battery power supply PS1, in the case where there is a shortage of electric power that is supplied from the battery power supply PS1 to the releasing motors 22, the control unit ECU may switch the source of electric power to be supplied from the batter power supply PS1 to the auxiliary power supply PS2 to drive the releasing motors 22 to activate the releasing operation.

There is imposed no specific limitation to the type of the auxiliary power supply PS2 as long as a storage battery is used, however, a capacitor that is electrically charged without involving a chemical reaction can preferably because the capacitor is superior in efficiency and service life to a battery that involves a chemical reaction in charging and discharging.

In the case were a shortage of electric power is detected in the battery power supply PS1, a display device such as an indicator provided in a position that is visible from the driver's seat inside the passenger compartment configured to indicate a shortage of electric power in the battery power supply PS1 is activated or alert information indicating a shortage of electric power in the battery power supply PS1 is sent to a terminal such as a smartphone that the user carries, so that the user is caused to recognize that a shortage of electric power is occurring in the battery power supply PS1. This can urge the user to switch the locking and unlocking mechanisms to the locking state by operating the portable operation switch SW10, the key cylinders KC, the lock knobs or the inside locking and unlocking operation switch SW11, thereby making it possible to prevent the user from leaving the motor vehicle with the side doors left unlocked.

Thus, while the embodiment of the invention has been described heretofore, the following various modifications or alterations or combinations thereof can be made to the embodiment described above without departing from the spirit and scope of the invention.

(1) As the side door, a sliding door is adopted that is supported on a lateral side surface of a vehicle body so as to be opened and closed in the front and rear direction.

(2) The side door is electrically opened and closed by a door opening and closing apparatus using a motor or the like as a drive source. As this occurs, after the meshing of the meshing mechanism is released through a door opening operation of the electric operation element, the door opening and closing apparatus is controlled to be driven to move the side door in the opening direction.

(3) In the case where the side door in which the locking and unlocking mechanism stays in the locking state is opened by controlling to drive the releasing motor 22 to activate the releasing operation, after a predetermined length of time elapses immediately after the releasing motor 22 has been controlled to be driven for the releasing operation, or when the door that is opened is closed, the locking and unlocking motor 14 is controlled to be driven to activate an unlocking operation to switch the locking and unlocking mechanism from the locking state to the unlocking state.

(4) Even though the authenticating module does not authenticate the ID signal, the side door that stays in the unlocking state is allowed to be opened by enabling a door opening operation through the outside operation switch SW1, SW3 of the relevant door and then performing the door opening operation.

REFERENCE SIGNS LIST 1F, 1R Door lock apparatus
2 Meshing unit
3 Operation unit
4 Body
5 Latch (Meshing mechanism)
6 Ratchet (Meshing mechanism)
7 Opening lever
8 Latch shaft
9 Ratchet shaft
10 First cover
11 Second cover
12 Waterproof side cover
13 Waterproof top cover
14 Locking and unlocking motor
14a Case
14b Output shaft
15 Locking and unlocking worm wheel (Locking and unlocking mechanism)
16 Locking lever (Locking and unlocking mechanism)
17 Knob lever
18 Opening link (Locking and unlocking mechanism)
19 Inside lever
19A First inside lever
19B Second inside lever
19C Child proof operation lever
19D Connecting link
19Da Elongated hole
19Db Lower projecting portion
19Dc Upper projecting portion
20 Key lever
21 Outside lever
22 Releasing motor
22a Case
22b Output shaft
23 Releasing worm wheel (Electric releasing mechanism)
24 Electric releasing lever (Electric releasing mechanism)
25 Wiring plate
26 Shaft
27 Spring
28 Coupling member
29 Holding member
31 Shaft
33 Coupling member
34 Spring
35 Spring
36 Torsion spring
39 Shaft
41 Striker entrance groove
51 Full latch engaging portion
52 Half latch engaging portion
53 Meshing groove
71 Released portion
101 Shaft
102 Support portion
103, 104, 111 Shaft
112 Arc hole
113 Opening
141 Worm
151 Toothed portion
161 Toothed portion
162 Coupling projecting portion
163 Cam surface
164 Arm portion
165 Guide wall
171 Coupling arm portion
172 Coupling hole
173 One portion
181 Rotating portion
182 Coupling hole
183 Coupling projecting portion
184 Releasing portion
191, 191A First arm portion
192 Second arm portion
192a, 192aB Abutment portion
193 Unlocking operating portion
195 Control hole
196 Elongated hole
197 Arc hole
198 Operating portion
211, 212 Coupling portion
221 Worm
231 Cam surface
241 First arm portion
242 Second arm portion
251 Coupler
ECU Control unit
FD Front side door
IH Inside handle (inside mechanical operation element)
KC Key cylinder
OH Outside handle
RD Rear side door
R1 Outside receiver
R2 Inside receiver
S Striker
SW1, SW3 Outside operation switch (Outside electric operation element)
SW2, SW4 Inside operation switch (Inside electric operation element)
SW5 Canceling switch
SW6 Transmitter
SW7 Locking and unlocking state detecting switch
SW8 Child proof locking state detecting switch
SW9 Vehicle speed sensor
SW10 Portable operation switch (Outside electric operation element)
SW11 Inside locking and unlocking operation switch
X Striker entrance line
V Motor vehicle
AL Notification means
PS1 Battery power supply
PS2 Auxiliary power supply.

The invention claimed is:

1. A motor vehicle door lock apparatus, comprising:
a meshing mechanism configured to mesh with a striker to thereby hold a door in a closed state;
a locking and unlocking mechanism configured to be selectively switched to an unlocking state where a meshing of the meshing mechanism can be released and a locking state where a meshing of the meshing mechanism cannot be released by a locking and unlocking motor as a drive source being driven;
an inside electric operation element provided on an inner side of the door;
a control unit configured to authenticate a transmitter based on a signal emitted by the transmitter, wherein the control unit is configured to enable an operation of the inside electric operation element when the transmitter is authenticated; and
an electric releasing mechanism configured to release a meshing of the meshing mechanism by the control unit driving a releasing motor to activate a releasing operation based on the operation of the inside electric operation element when the control unit authenticates the transmitter,
wherein the control unit is configured to:
in a case where the transmitter outside the motor vehicle is disposed within a predetermined area on the outer side of the door, authenticate the transmitter; and
in response to the transmitter outside the motor vehicle being switched from the authenticated state to a non-authenticated state when the transmitter is dislocated from the predetermined area, drive the locking and unlocking motor to activate a locking operation so as to switch the locking and unlocking mechanism to the locking state.

2. The motor vehicle door lock apparatus according to claim 1,
wherein the control unit is configured to enable the operation of the inside electric operation element even when the transmitter not authenticated.

3. The motor vehicle door lock apparatus according to claim 1, further comprising:
canceling device configured to disable the operation of the inside electric operation element of a predetermined door, regardless of the transmitter being authenticated or not authenticated.

4. The motor vehicle door lock apparatus according to claim 1,
wherein when driving the locking and unlocking motor to activate a locking operation as a result of the transmitter being switched to the non-authenticated state, the control unit is configured to activate a notification device, the notification device being configured to notify that the locking and unlocking mechanism is switched to the locking state at least one of visibly and audibly.

5. The motor vehicle door lock apparatus according to claim 4,
wherein the notification device is activated by the control unit when the meshing of the meshing device is released by the control unit driving the releasing motor to activate the releasing operation, and
wherein an operation mode of the notification device when the locking and unlocking mechanism is switched to the locking state as the result of the transmitter being switched to the non-authenticated state and an operation mode of the notification device when the meshing of the meshing mechanism is released differ from each other.

6. The motor vehicle door lock apparatus according to claim 4,
wherein the notification device is also activated by the control unit when the locking and unlocking mechanism is switched to the unlocking state as a result of the locking and unlocking motor being driven to activate an unlocking operation by the control unit, and
wherein an operation mode of the notification device when the locking and unlocking mechanism is switched to the locking state as a result of the transmitter being switched to the non-authenticated state and an operation mode of the notification device when the locking and unlocking mechanism is switched to the unlocking state differ from each other.

7. The motor vehicle door lock apparatus according to claim 4,
wherein the locking and unlocking mechanism is configured to be switched to the unlocking state and the locking state by operating a mechanical operation element that is provided on at least either of the outer side and an inner side of the door, and
wherein the notification device is activated by the control unit when the locking and unlocking mechanism is switched to the locking state through the operating of the mechanical operation element.

8. The motor vehicle door lock apparatus according to claim 4,
wherein the control unit is configured to drive the locking and unlocking motor so as to switch selectively the locking and unlocking mechanism to the unlocking state based on an operation of a locking and unlocking operation switch provided inside the motor vehicle, and
wherein the notification device is activated by the control unit when the locking and unlocking mechanism is switched to the locking state by the control unit driving the locking and unlocking motor to activate the locking operation based on the operation of the locking and unlocking operation switch.

9. The motor vehicle door lock apparatus according to claim 1,
wherein the locking and unlocking motor and the releasing motor are configured to be driven by electric power supplied from a battery power supply mounted on the motor vehicle.

10. The motor vehicle door lock apparatus according to claim 9, further comprising:
an auxiliary power supply configured to supply electric power to the locking and unlocking motor,
wherein in a case where there is a shortage of electric power supplied from the battery power supply to the locking and unlocking motor, the control unit switches the supply of electric power to electric power supplied from the auxiliary power supply to drive the locking and unlocking motor to activate the locking operation.

11. The motor vehicle door lock apparatus according to claim 10,
wherein the auxiliary power supply is further configured to supply the electric power to the releasing motor, and
wherein in a case where there is a shortage of electric power supplied from the battery power supply to the releasing motor, the control unit switches the supply of electric power to electric power supplied from the auxiliary power supply to drive the releasing motor to activate the releasing operation.

12. The motor vehicle door lock apparatus according to claim 9,
wherein in a case where there is a shortage of electric power supplied by the battery power supply, the control unit activates an indicator to indicate the shortage of electric power supplied by the battery power supply, the indicator being provided in a position visible from a driver's seat inside a passenger compartment.

13. The motor vehicle door lock apparatus according to claim 9,
wherein in a case where there is a shortage of electric power supplied by the battery power supply, the control unit sends alert information indicating the shortage of electric power supplied by the battery power supply to a terminal that is carried by a user.

* * * * *